(12) United States Patent
Partan et al.

(10) Patent No.: US 10,375,939 B2
(45) Date of Patent: Aug. 13, 2019

(54) RETRIEVAL SYSTEM FOR UNDERWATER OBJECTS

(71) Applicant: Woods Hole Oceanographic Institution, Woods Hole, MA (US)

(72) Inventors: James Partan, Woods Hole, MA (US); Keenan Ball, Woods Hole, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 255 days.

(21) Appl. No.: 15/601,441

(22) Filed: May 22, 2017

(65) Prior Publication Data

US 2017/0332612 A1 Nov. 23, 2017

Related U.S. Application Data

(60) Provisional application No. 62/339,157, filed on May 20, 2016.

(51) Int. Cl.
| | |
|---|---|
| *A01K 69/08* | (2006.01) |
| *A01K 69/10* | (2006.01) |
| *B63B 21/60* | (2006.01) |
| *B63B 22/06* | (2006.01) |

(52) U.S. Cl.
CPC ............. *A01K 69/08* (2013.01); *A01K 69/10* (2013.01); *B63B 21/60* (2013.01); *B63B 22/06* (2013.01)

(58) Field of Classification Search
CPC ......... B63B 22/00; B63B 22/06; B63B 22/08; B63B 21/56; B63B 21/60; B63C 7/00; B63C 7/06; B63C 7/10; B63C 7/20; B63C 7/22; A01K 69/08; A01K 69/10
USPC ........................ 441/2, 23; 405/188, 190, 191
See application file for complete search history.

(56) References Cited

U.S. PATENT DOCUMENTS

| | | | | |
|---|---|---|---|---|
| 3,722,014 | A * | 3/1973 | Hill .......................... | B63B 22/06 441/2 |
| 4,136,415 | A * | 1/1979 | Blockburger ........... | B63B 21/60 441/2 |
| 5,219,245 | A * | 6/1993 | Chin-Yee ................ | B63B 22/06 441/23 |

* cited by examiner

*Primary Examiner* — Lars A Olson
(74) *Attorney, Agent, or Firm* — Douglas Denninger; Gabriel Hendricks

(57) ABSTRACT

A retrieval system and methods of preparing and using same to retrieve underwater objects from a selected depth, including a flotation device having at least a selected amount of buoyancy, a release mechanism that is capable of releasably engaging an anchor, and a controller to actuate the release mechanism when a selected condition is achieved. The system further includes a spool assembly having a frame for carrying (i) the floatation device, (ii) the release mechanism, (iii) the controller and (iv) in combination with the flotation device, a quantity of pre-wound line having a length greater than the selected depth.

25 Claims, 17 Drawing Sheets

RETRIEVAL SYSTEM FOR UNDERWATER OBJECTS

CROSS REFERENCE TO RELATED APPLICATIONS AND PUBLICATIONS

This application claims priority to U.S. Provisional Application No. 62/339,157 filed on 20 May 2016. The entire contents of the above-mentioned application is incorporated herein by reference.

STATEMENT REGARDING FEDERALLY FUNDED RESEARCH OR DEVELOPMENT

This work was supported by the National Oceanic and Atmospheric Administration and the National Marine Fisheries Service under Grant No. NA10NMF4520343. The government has certain rights in the invention.

FIELD OF THE INVENTION

This invention relates to retrieval systems for benthic devices and more particularly to improved fishing gear systems adapted to reduce the entanglement of marine animals in fishing lines connected to submerged objects such as lobster pots or crab traps, especially in deep water encountered in offshore fisheries.

BACKGROUND

There are many applications that require objects to be deployed and later retrieved from the bottom of a body of water, and of particular interest is the retrieval of fishing traps in the ocean. To facilitate retrieval, buoys and vertical fishing lines are attached to a trap or a series of traps to mark the location and provide a point of attachment to bring the trap back up to the surface and onto the deck of the vessel.

Although these buoys are visible on the surface, the lines descending from the buoys are nearly invisible to aquatic animals such as whales, dolphins, sharks, sea turtles, seals, and other large animals who swim into the lines and become tangled. Specifically, endangered Northern Atlantic right whales are continuously threatened by entanglement with fishing gear dispersed throughout their natural habitat including gear set to catch lobsters, crabs, cod, haddock, and other commercially valuable fish. Although many of these large animals are capable of breaking a sufficiently thin line from the trap, many animals still cannot remove all of the line from their fins. Others die while tangled in the line of the tethered trap. Heavier gear such as those used in the offshore fishery appears to present an even larger risk for North Atlantic right whales, because offshore traps require using lines which are far more robust than shallow water gear. Incidents of entangled animals leads to seasonal closures of fishing areas and increasingly limits the available areas for fisherman. Closures are likely to continue and may expand as government regulations increase.

Entanglement mitigation efforts are currently in effect for shallow water fishing (i.e., "inshore fishing") which namely use weak lines and weak links/splices in the line designed to break upon sufficient force. While these methods may have reduced the problem, many animals are still negatively impacted by the use of vertical lines in fishing. Furthermore, these mitigation techniques are not viable for deeper waters (i.e., "offshore fishing") where heavier lines are needed to withstand the water conditions and to support the retrieval of multiple traps on a single "long line" configuration.

On-call fishing gear aims to reduce the entanglements of North Atlantic right whales and other marine mammals and the number of areas otherwise closed off to trap fishing. On-call fishing, not currently used extensively in the U.S., secures vertical lines down near the water body floor until released to the surface for hauling. One on-call system is described by Fiotakis in U.S. Pat. No. 6,261,142. Unfortunately, most on-call systems require specialized deck gear and are too expensive to be commercially-viable for the average fisherman for traps and gillnet gear. These costs only increase as the gear is modified for offshore fishing, which requires heavier lines, longer lengths, and stronger equipment.

While certain on-call systems and other "rope-less" systems have been proposed to reduce animal entanglements, most if not all are used for inshore fishing with water depths of about 50 to 70 m but are incapable of withstanding water conditions over 100 m. The offshore lobster fishery has water depths up to 300 m or more, and high surface currents of about 1 to 2 knots. When used in deep waters and high currents, existing on-call gear fails to operate correctly, often being dragged from its designated location and permanently lost. Systems suitable for deep water must be designed for the high currents with compensation in weight, buoyancy, and dimension. Thus, the existing lightweight on-call technologies are only reliable at shallow depths.

Existing systems are further plagued with several other design issues which prevent deep water use. To be effective, deep water systems would require increased strength and greater overall weight; therefore, deep water systems also must be balanced for buoyancy, often requiring up to 200 lbs of positive buoyancy capable of surviving great depths. Furthermore, these existing systems typically employ weak links and reduced breaking strength ropes which are cost-effective and suitable for shallow water but are not viable for the large and heavy trawls of up to 50 traps that are used in offshore fishing.

Therefore, there is an unmet need, particularly in the fishery industry, to provide a robust on-call fishing gear system capable of use in deep water and high currents while maintaining a lower impact on the surrounding ecological environment.

SUMMARY OF THE INVENTION

Accordingly, it is an object of the present invention to provide a system and method to enable practical use of on-call fishing gear, especially in deeper waters.

This invention features a retrieval system for use with underwater objects to be retrieved from a selected depth, including a flotation device having at least a selected amount of buoyancy, a release mechanism that is capable of releasably engaging an anchor, and a controller to actuate the release mechanism when a selected condition is achieved. The system further includes a spool assembly having a frame for carrying (i) the floatation device, (ii) the release mechanism, (iii) the controller and (iv) in combination with the flotation device, a quantity of line having a length greater than the selected depth. The spool assembly is capable of receiving the quantity of line as a pre-wound unit.

In certain embodiments, the frame includes a spine with an upper portion having at least one of (i) an upper spine plate and (ii) an upper end cap, a lower portion having at least one of (iii) a lower spine plate and (iv) a lower end cap, and a central portion including a plurality of elongated members extending between the upper portion and the lower portion. In some embodiments, the release mechanism is positioned proximate to the lower portion, the spine includes both a lower spine plate and a lower end cap, and the lower end cap is removably secured to the central portion to assist at least one of (a) loading and (b) releasing the line relative to the central portion.

In a number of embodiments, the flotation device defines a curved outer surface and is removably secured to the central portion of the spine to establish a core outer diameter. In some embodiments, the flotation device is formed from at least two sections, each section being removably secured to the central portion of the spine. Preferably, the controller includes a timer and is contained within a water-proof housing having a depth rating at least as great as the selected depth.

In some embodiments, the system further includes the quantity of line being wrapped in a toroidal shape that defines an inner opening, and wherein the line retains its toroidal shape prior to installation on the spool assembly. An anchor is removably connected to release mechanism and having a weight sufficient to counteract the selected amount of buoyancy of the flotation device to retain the spool assembly at the selected depth.

This invention also features a modular retrieval system for use with underwater objects to be retrieved from a selected depth in a water column, including a flotation device defining a cylindrical outer surface having a first diameter and having at least a selected amount of buoyancy. A release mechanism is capable of releasably engaging an anchor, and a housing contains a controller for actuating the release mechanism when a selected condition such as a release trigger is achieved. The system further includes a quantity of line having a length greater than the selected depth, the line being wrapped in a toroidal shape that defines an inner opening having a second diameter that is at least as large as the first diameter. A spool assembly has a spine with an upper portion having at least one of (i) an upper spine plate and (ii) an upper end cap, a lower portion having at least one of (iii) a lower spine plate and (iv) a lower end cap, and a central portion including a plurality of elongated members extending between the upper portion and the lower portion, such as between the upper end cap and the at least one of the lower spine plate and the lower end cap, or between the upper spine plate and the lower spine plate. The release mechanism is positioned proximate to the lower portion, and the central portion carries the floatation device, the release mechanism, the controller and the quantity of line. In some embodiments, the retrieval system retains a low profile in the water column until actuation of the release mechanism and, when the release mechanism is actuated, the retrieval system is released into the water column and rises to the surface of the water.

Also featured is a method of enabling reloading of a retrieval system for use with underwater objects to be retrieved from a selected depth, the method including selecting a quantity of line having a length greater than the selected depth, and forming the line into a pre-wound toroid including applying a binder to at least a portion of the toroid such that the line retains its toroidal shape by itself prior to installation on a spool assembly. The method further includes providing the pre-wound toroid to a user with a retrieval system having a spool assembly with a frame for carrying the pre-wound toroid in combination with a flotation device.

This invention features a method of reloading a retrieval system suitable for underwater use, including accepting and taking possession of a retrieval system after the retrieval system has been used, wherein the retrieval system is an assemblage of components including a flotation device having at least a selected amount of buoyancy, a release mechanism that is capable of releasably engaging an anchor, a controller to actuate the release mechanism when a selected condition is achieved, and a spool assembly having a frame for carrying (i) the floatation device, (ii) the release mechanism, (iii) the controller and (iv) in combination with the flotation device, a quantity of line having a length greater than the selected depth. The method further includes respooling the line onto the retrieval system as a pre-wound unit using either the original line or a replacement line, and providing the reloaded retrieval system to the user.

This invention further features an on-call retrieval system adapted for use in offshore conditions, the system including a modular spool assembly with a buoyant core holding a pre-selected length of line having an appropriate strength and scope for operating in selected offshore depth and current conditions. The retrieval system is deployed along with one or more loads such as traps and anchors, and retains a low profile without a vertical line leading to the water surface until a release trigger actuates the release mechanism, allowing the line to release to the surface while remaining tethered to the submerged load. Once the line has reached the surface, the entire system may be retrieved. The recovered system or components thereof may then be exchanged and prepared for the next deployment.

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION OF THE PREFERRED EMBODIMENTS

Figure 1A:
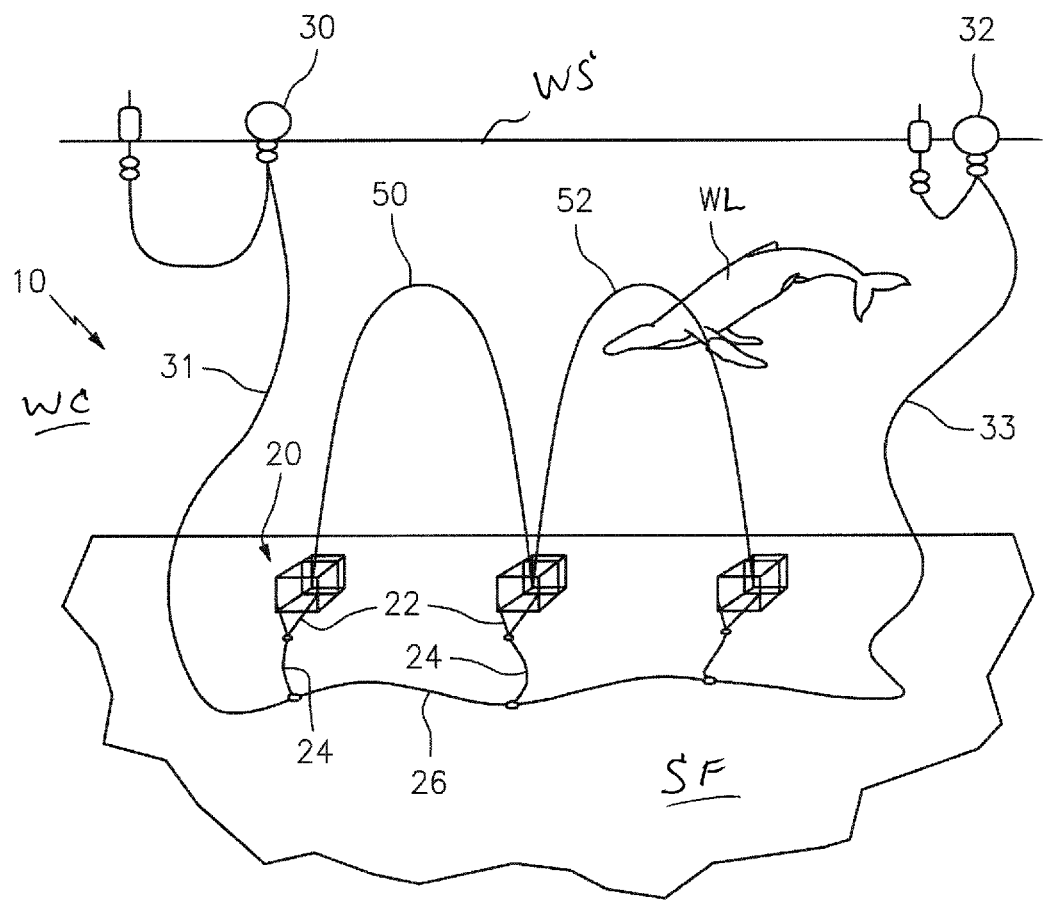
FIG. 1A schematically illustrates a common fishing system configuration wherein a series of underwater traps may be strung together with floating lines rising into the water column between the traps and at least one vertical buoy line continuously marking the location of the traps.

This invention may be accomplished by a retrieval system for use with underwater objects such as lobster traps to be retrieved from a selected depth. The system includes a flotation device having at least a selected amount of buoyancy suitable for at least a portion of the system to reach the surface of the water after decoupling from an anchor, a release mechanism that is capable of releasably engaging an anchor, and a controller to actuate the release mechanism when a selected condition is achieved. The system further includes a spool assembly having a frame for carrying (i) the floatation device, (ii) the release mechanism, (iii) the controller and (iv) in combination with the flotation device, a quantity of line having a length greater than the selected depth. The spool assembly is capable of receiving the quantity of line as a pre-wound unit.

In some constructions, the frame includes a spine with an upper portion having at least one of (i) an upper spine plate and (ii) an upper end cap, a lower portion having at least one of (iii) a lower spine plate and (iv) a lower end cap, and a central portion including a plurality of elongated members extending between the upper portion and the lower portion.

In certain constructions, the line is formed as a separable and replaceable line cartridge, also referred to as a line pack, as described in more detail below. The retrieval system retains a low profile in the water column until actuation of the release mechanism and, when the release mechanism is actuated, the retrieval system is released into the water column and rises to the surface of the water. The system may further include one or more gear detector devices or equipment. The system is described in more detail below in relation to FIG. 2 onward.

Endangered whales, turtles, and other marine animals are known to become entangled in vertical lines used in fixed-gear fisheries. Vertical lines, particularly the heavier lines used in offshore fishing, are a particular risk for endangered North Atlantic right whales. Vertical lines are most often present tethering one or more buoys to the submerged trawl of traps and tethering traps together. Reducing the number of vertical lines in the water column at any given time is the primary motivation behind developing on-call fishing technology. An on-call fishing gear system secures the vertical lines used in fixed-fishing gear near the water bottom until the lines are released for hauling. This allows the lines to be present in the water column for a more limited time, thus reducing the odds of animal impact.

The terms "offshore fishing", "offshore conditions", and "deep water" are utilized herein to include water depths greater than 50 m, preferably greater than 100 m, and generally greater than 200 m.

The terms "inshore fishing" and "inshore conditions" are utilized herein to include water depths less than 200 m, preferably less than 100 m, and generally less than 70 m.

The terms "on-call fishing", "on-call system", "rope-less fishing" and "rope-less system" as utilized herein refers to a system capable of restraining line, specifically a substantially vertical line, from continuously remaining in the water column during system deployment.

The term "vertical line" as utilized herein refers to a line tethering gear disposed on the bottom of a water body wherein the line is present across different depths in the water column.

The term "scope" refers to the ratio of total line deployed to the intended water depth of use. For example, a 2:1 scope for 100 m depth would require at least 200 m of line.

FIG. 1A illustrates a standard trawl 10 of connected traps 20 on seafloor SF with surface buoys 30 and 32 at water surface WS of water column WC. Seafloor SF lies at the bottom of water column WC. Each trap 20 is connected to a groundline 26 and vertical buoy lines 31, 33 by a section of rope 24, referred to as a gangion 24, which is harnessed to a smaller section of rope referred to as the bridle 22 attached to the trap 20, with each connection typically made by a knot or a splice site. While the groundlines 26 linking the traps 20 to the vertical buoy lines 31 and 33 may be sinking ropes, the entanglement hazard for a marine animal such as a whale WL is mainly in the vertical lines 31 and 33 shown connecting to the buoys 30, 32 and any optional floating line 50, 52 in between traps 20.

Utilizing multiple sections and types of line allows the user additional flexibility in configuration. In some fishing areas, there may also be one or more anchors incorporated into the ends of the trawls. The offshore fishery has similar configurations, but generally with heavier gear, longer lines, and more traps per trawl.

System Overview

Figure 1B:
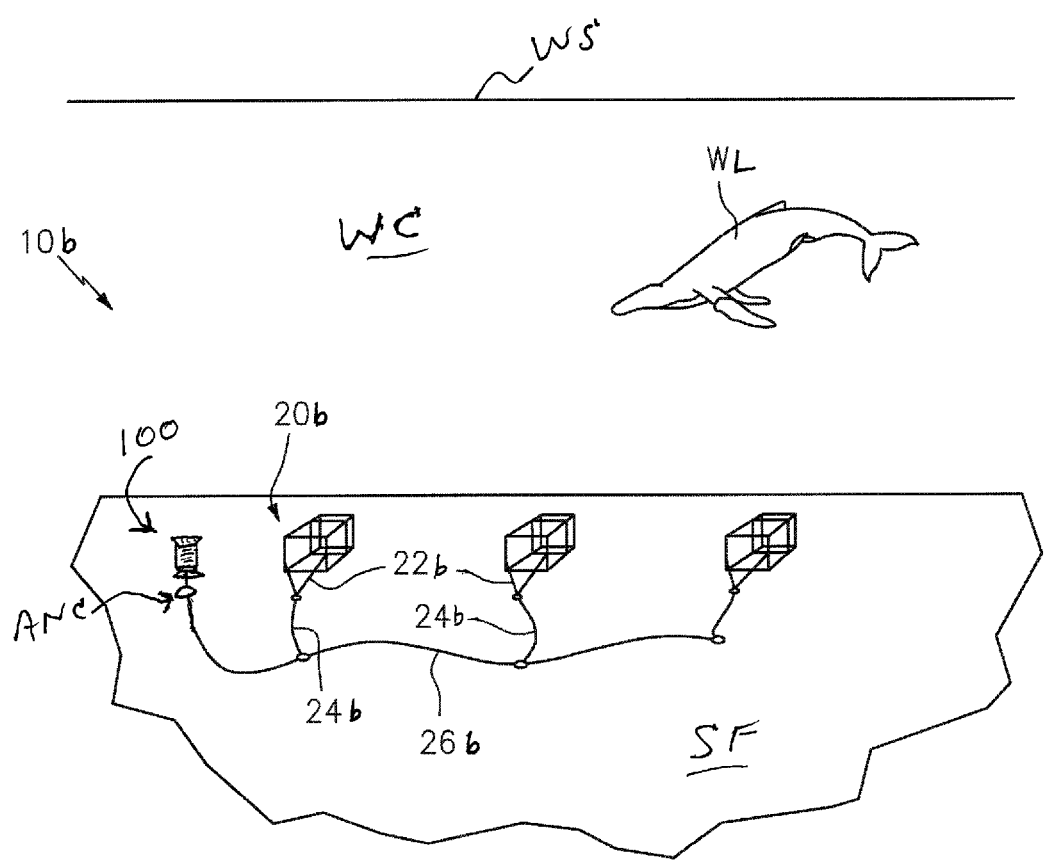
FIG. 1B is a view similar to FIG. 1A showing an on-call retrieval system according to the present invention attached to a series of traps and positioned wholly on the bottom.

A trawl 10*b*, FIG. 1B, utilizes a fully assembled on-call retrieval system 100 according to the present invention, FIGS. 1B-3. System 100 is suitable for use with the same types of conventional traps 20*b*, each trap 20*b* resting on seafloor SF and having a bridle 22*b* and a gangion 24*b* attached to a groundline 26*b*. The retrieval system 100 includes an anchor ANC in this construction to retain system 100 against the bottom (seafloor SF) of water column WC.

Figure 2:
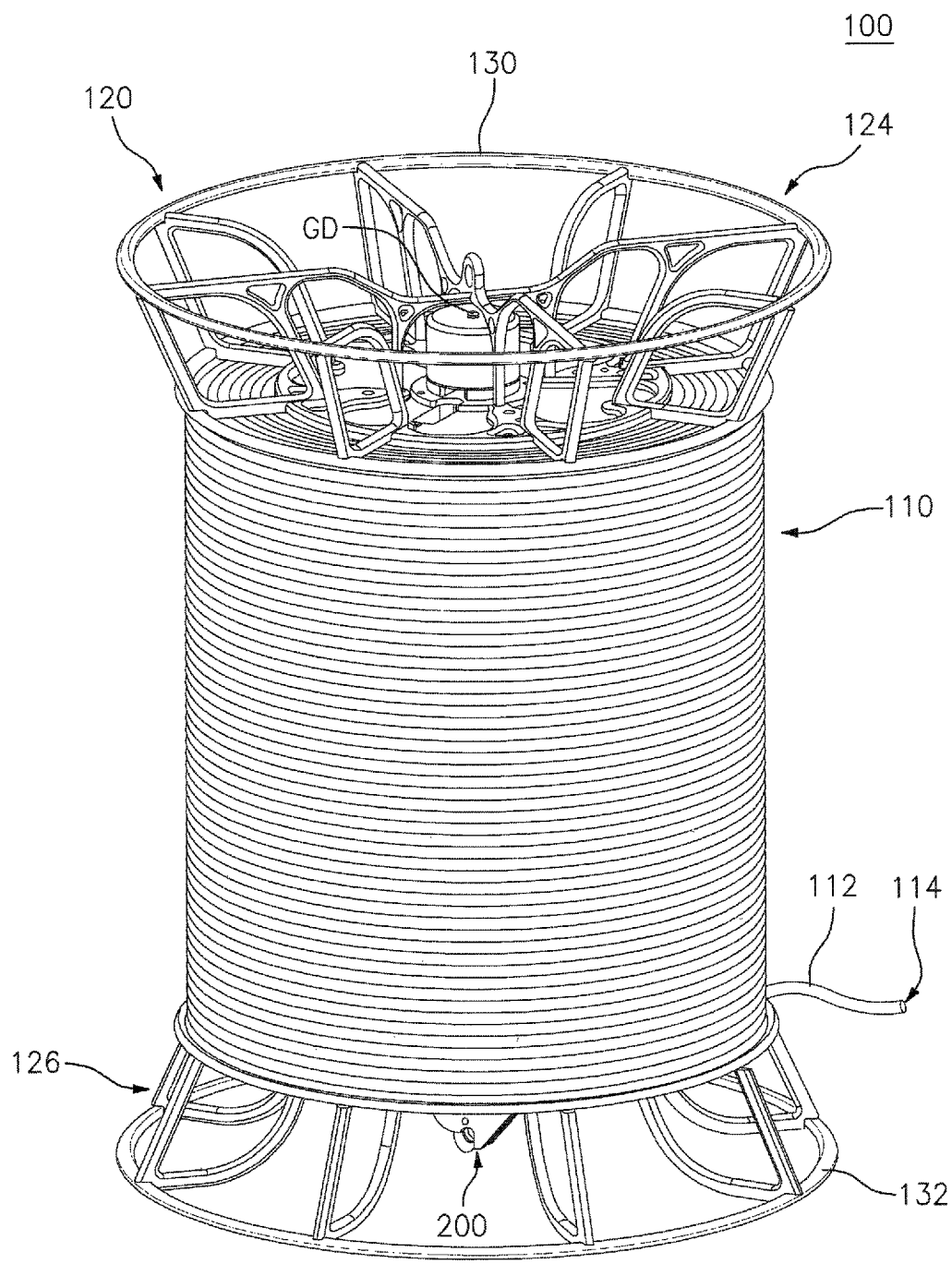
FIG. 2 is a schematic perspective view of a fully assembled on-call retrieval system according to the present invention carrying wound line prior to deployment.
Figure 3:
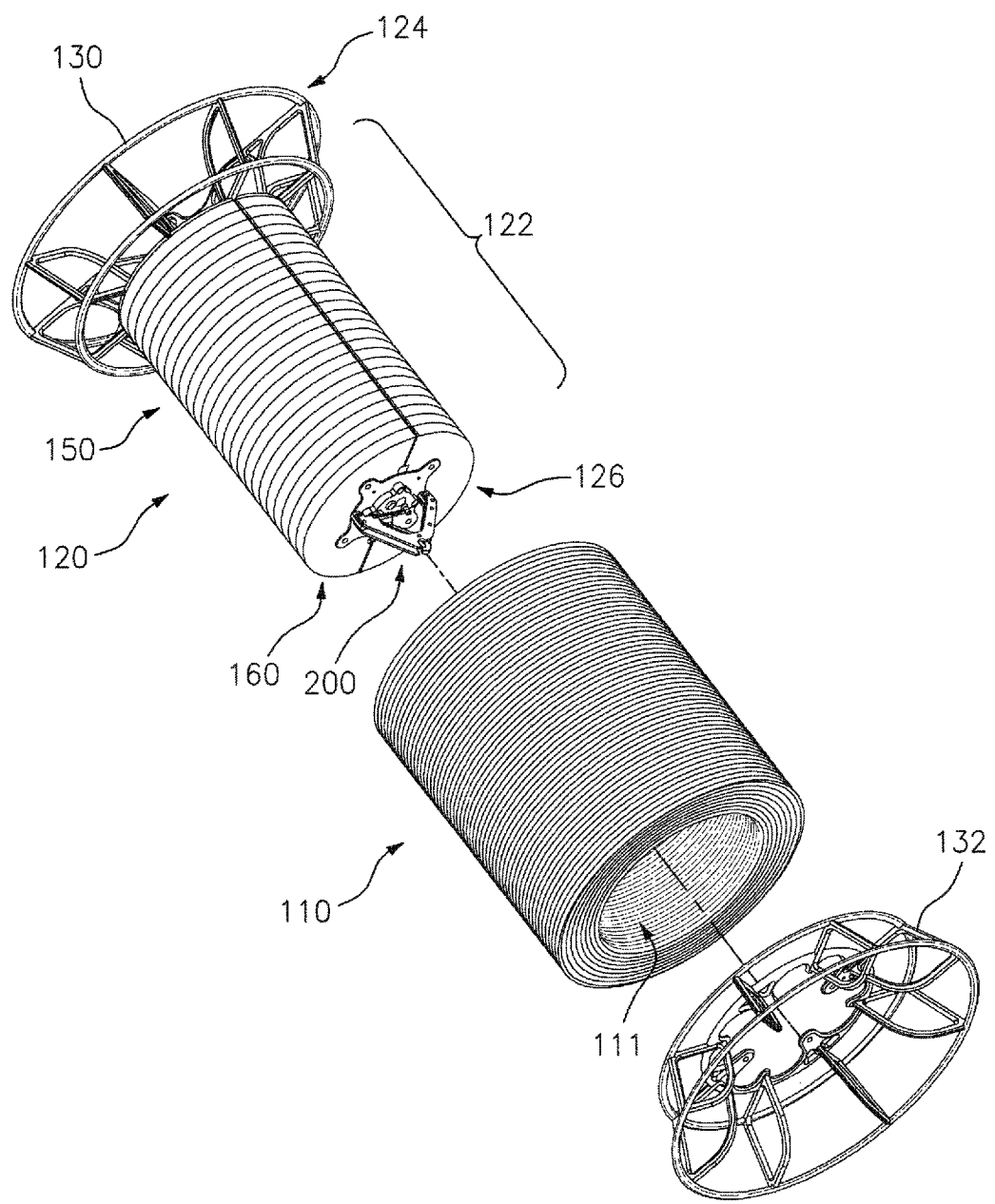
FIG. 3 is an exploded perspective view of the system of FIG. 2 with the line forming a line cartridge that is separable and replaceable from a spool assembly according to the present invention.

System 100 carries a line 110, FIGS. 2-3, on a spool assembly 120 prior to deployment. A working line portion 112 having an end 114 extends from wound line 110. In some constructions, end 114 has an eye splice or other terminal feature. As described in more detail below, in certain constructions the wound line 110 is pre-wound and retains its toroidal shape prior to installation on the spool assembly 120 as a separable toroidal line cartridge.

The spool assembly 120 has a central portion 122, an upper portion 124 and a lower portion 126. Upper portion 124 includes an upper end cap 130 and lower portion 126 includes a lower end cap 132. In constructions utilizing pre-wound line units, also referred to herein as line cartridges, at least one of end caps 130, 132 are removable to facilitate loading of the line cartridge; lower end cap 132 is removable in this construction. As depicted in FIG. 4B, end cap 130 in this construction has inner and outer rims 131, 133 and a central circular attachment ring 135. Also depicted in FIGS. 2 and 4B is a gear detector GD, which is described in more detail below.

The spool assembly 120 also carries a flotation device 150, FIGS. 3 and 4A, having modular flotation sections 152 and 154 which have curved outer surfaces 153 and 155, respectively, and which are removably held on a frame 160 as described in more detail below. Each flotation section 152, 154 has a predetermined amount of buoyancy which, when added together, provide a selected amount of buoyancy for the retrieval system 100. The outer surfaces 153, 155 of flotation sections 152, 154 define a first outer diameter, also referred to as a core outer diameter; if the line 110 is not wound directly onto the spool assembly 120, then the line 110 is wrapped separately in a toroidal shape that defines an inner opening 111 having a second diameter that is at least as large as the first core diameter.

Structural support for spool assembly 120 is provided by a frame 160 which carries (i) the floatation device 150, (ii) a release mechanism 200, (iii) a controller 230 in a housing 220, and (iv) in combination with the flotation device 150, the line 110. In this construction, the frame 160 includes a structural spine 162 with an upper portion 164 having an upper spine plate 165 and a lower portion 166 having a lower spine plate 167. Spine 162 further includes a central spine portion 170 including a plurality of elongated members such as rods 172 and 174 shown in dashed lines in FIG. 5 extending between lower spine plate 167 and the upper spine plate 165, FIG. 4B.

Because the elongated members 172, 174 (plus two other members in this construction, not shown in FIG. 5 for clarity of illustration) are rigidly attached to the upper and lower spine plates 165, 167, the housing 220 containing the controller 230 is not required to add to the structural integrity of the spool assembly 120, as discussed in more detail below. Further, the end caps 130 and 132 can be readily removed from the spool assembly 120 without affecting its structural integrity.

Figure 4A:
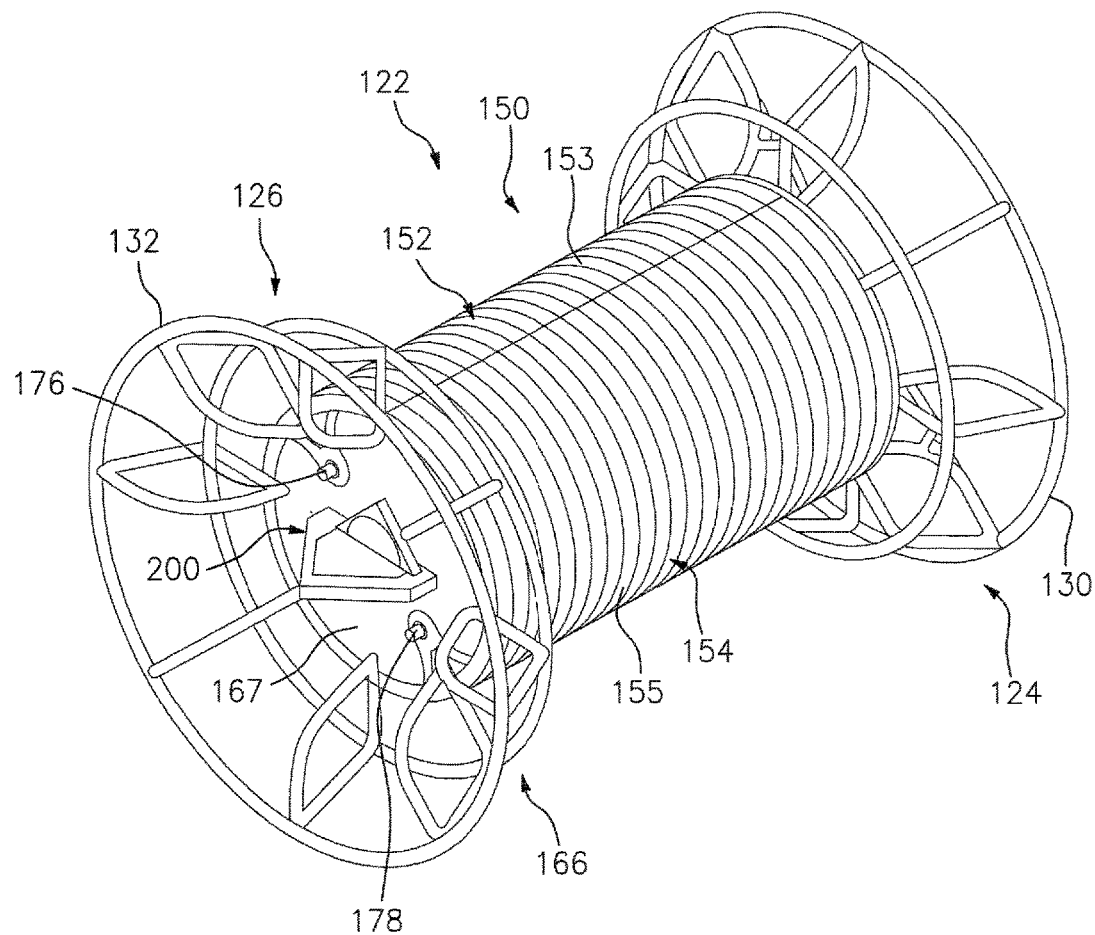
FIG. 4A is a lower perspective view of the spool assembly of FIGS. 2 and 3.
Figure 4B:
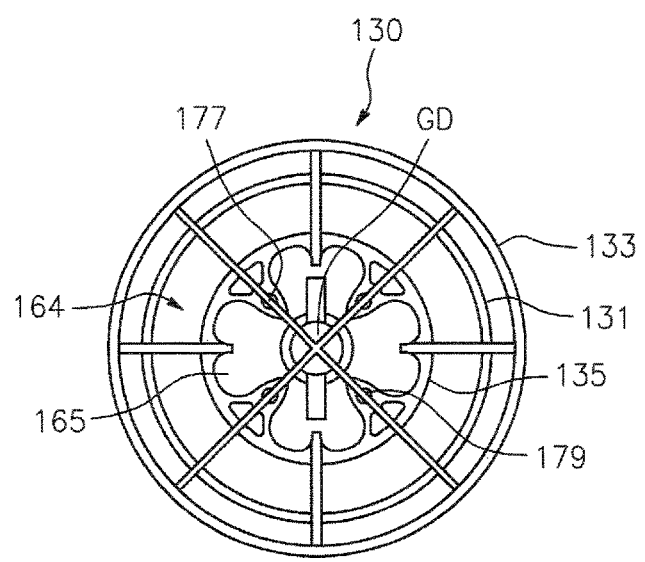
FIG. 4B is an top end view of the spool assembly of FIG. 4A.

A plurality of lower fasteners, including fasteners 176 and 178, FIG. 4A, removably secure lower end cap 132 and a plurality of upper fasteners, including fasteners 177 and 179, FIG. 4B, removably secure upper end cap 130. In some constructions, the fasteners 176, 177 and 178, 178 are associated with elongated members 172, 174, FIG. 5 and, in other constructions, are spaced apart on the spine plates 167, 165 from those elongated members. In this construction, the lower end cap 132 is removably secured to the central spine portion 170 within the central portion 122 of the spool assembly 120 to assist at least one of (a) loading and (b) releasing the line 110 relative to the central portion 122 as discussed in more detail below.

Figure 5:
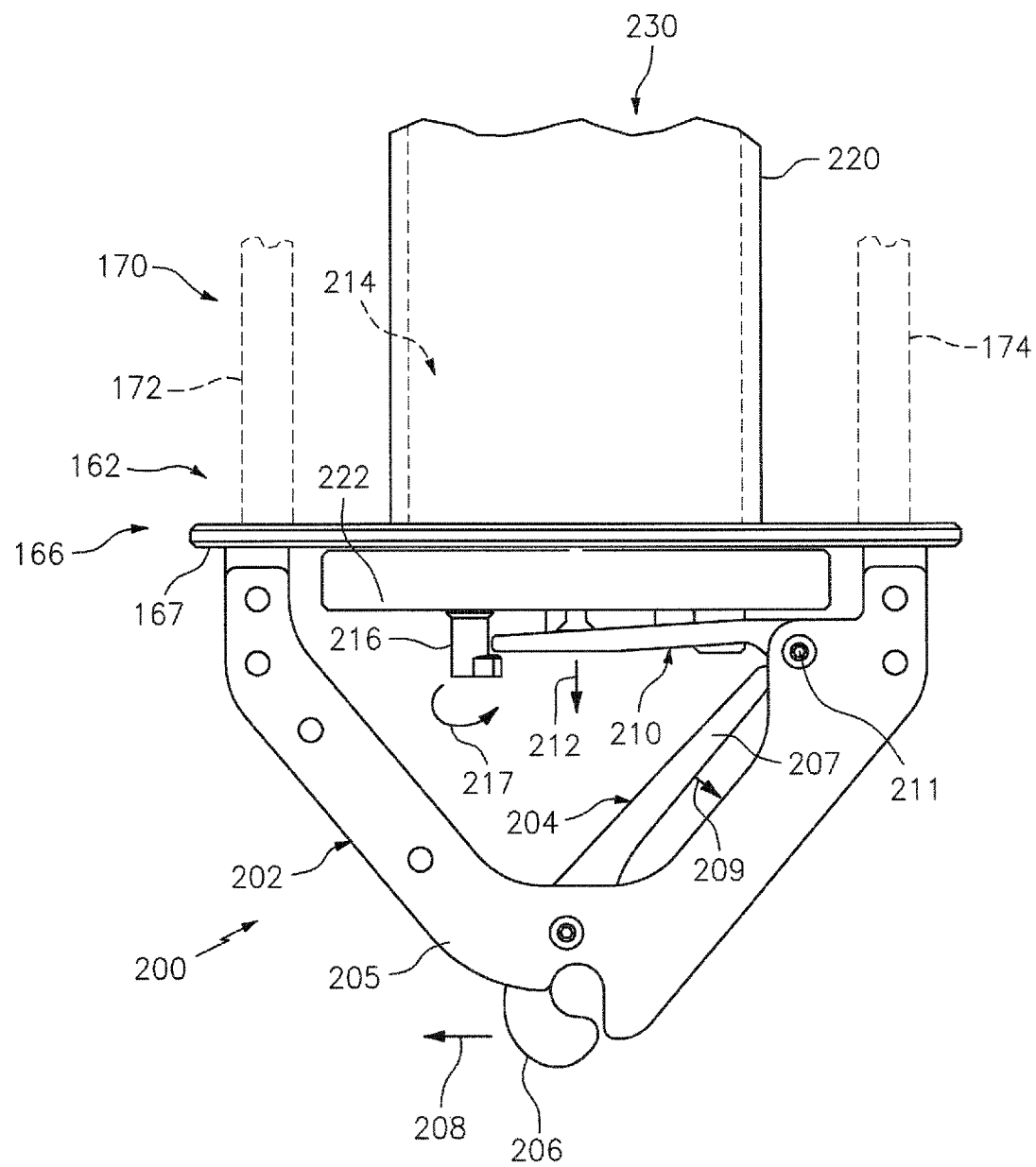
FIG. 5 is a schematic side view of the release mechanism, inner water-proof housing with controller, and lower spine plate of the spine assembly of FIG. 4A.

The release mechanism 200, as best shown in FIG. 5, is positioned proximate to the lower end cap 132 and the lower spine plate 167. The release mechanism 200 is capable of releasably engaging an anchor having a negative buoyancy sufficient to counteract the overall buoyancy of retrieval system 100. Further details for the release mechanism 200 and controller 220 are provided below, particularly in relation to FIGS. 6A-9.

The invention described herein improves existing on-call fishing technology with a novel design capable of operation in deep water and in high currents. While existing systems are intended for use in shallow waters up to 100 m, this inventive system, referred to as the on-call system, may be deployed to depths up to 450 m or more with a nominal target depth of the system of about 300 m. Additionally, the system may be operated in offshore fishery regions such as the Gulf of Maine which includes the edge of the Continental Shelf where the water depth can vary dramatically in small distances. The system may be used in conditions of high surface currents (e.g., about 1 to 2 knots). While this technology has been developed for the offshore fishing industry, inshore areas, particularly those which have had seasonal fishery closures due to critical habitats for North Atlantic right whales, will be greatly benefited by the present invention by potentially re-opening these areas to on-call fishing gear.

The modular design extends the range of use as the various components can be scaled from the more oceanographically challenging offshore environment to shallower inshore areas, providing a system of increased adaptability in a plurality of fishing environments and depths to create the optimal system for each deployment. Furthermore, this design allows for simple repair if necessary without the need to replace the entire system.

In order to prevent animal entanglements and potentially loss due to theft, the on-call system is designed to remain near the bottom, as shown in FIG. 1B, without a vertical line continuously leading to the surface as is common in standard fishing systems shown in FIG. 1A. In the improved system, all vertical lines remain secured below the surface preferably near the bottom until the lines are released for gear retrieval.

The present invention is designed with feasibility in mind in terms of system sizes and weights typically handled by offshore fisherman and their gear handling equipment. Ideally, a vessel need not be refitted with new gear-hauling equipment compatible with the present system. In many embodiments, the weight during retrieval of the on-call system is on the order of an offshore lobster trap with catch (i.e., trapped load).

Because offshore fishing gear requires heavier lines, none of the existing on-call fishing gear systems provide anywhere near the required buoyancy to bring a line to the surface (38 lbs for the best-documented prior work, versus 140 to 180 lbs required for the offshore fishery along the edge of the Continental Shelf).

In many embodiments, the on-call system is comprised of a modular spool assembly, a line which may be formed as a line cartridge, a release mechanism, and a controller, for use with one or more devices such as traps. The system may further comprise a gear detector system.

Spool Assembly

The modular spool assembly secures the line from floating in the water column prior to the activation of the release mechanism. In other words, the spool assembly maintains the low profile of the system to a position near or on the bottom of the body of water (e.g., seafloor). Additionally, in many embodiments, the spool assembly also provides the means to tether the submerged trap or other object to the surface to facilitate gear retrieval via the line.

Preferred spool assembly and line cartridge design parameters include the following considerations:

(1) A flotation depth rating needs a safety margin greater than a typical 300 m depth specification due to the drastically changing bottom contours in the offshore waters. Without such a safety margin, flotation failure at those depths would result in lost gear.

(2) The system needs to be sized (physical dimension and weight) for easy handling where minimal hauling gear is available (e.g., no A-frames or cranes). Many fishing vessels do not have the full suite of lifting equipment that is often available on oceanographic research vessels. As such, the on-call system needs to be sized comparably to existing fishing gear for fishermen to lift and maneuver the system with limited mechanical assistance.

(3) The spool assembly is preferably able to hold sufficient line, preferably in the form of a line cartridge, while still comprising the necessary available buoyancy to overcome the water currents in offshore deep waters. Preferred embodiments of the on-call system use at least 101% (1.1:1), and preferably 200% to 300% (2:1 to 3:1) scope. This is to say that the ratio of total available line is about 200% to 300% greater than the intended water depth for use (i.e., a scope of 2:1 to 3:1). For example, for a 300 m depth use, the line is preferably about 600 to 900 m in length.

(4) The on-call system should minimize the time required at sea for redeployment. At present, a crewman is often dedicated to figure-eight the line coming aboard from the trawl down in the line locker of the fishing vessel. This same man could possibly be trained to properly spool line onto a spool assembly or to form a line cartridge, but it would take significantly more time while on site.

(5) In a system based on an acoustic release, the acoustic transducer should extend above the flotation device to provide a clear line of sight to the surface. Flotation acts as an acoustic baffle that prevents sound from passing through the material due to the acoustic impedance differences.

(6) The system should be robust and rugged enough to handle the rigorous handling of gear that is typical on board fishing and oceanographic research vessels and with minimal mechanical assistance. There is not ample room on the deck of an offshore fishing vessel, and typically gear gets dropped and dragged around on the deck. Furthermore, the on-call system should be robust enough to handle the rough conditions experienced in offshore waters both above the water and when deployed.

Taken into heavy consideration is the balance between buoyancy and compact form; the optimal on-call system comprises enough buoyancy to manage the weight of a line capable of withstanding the heavy forces applied by the attached traps, the impacts of strong water currents, and providing appropriate length for deep water depths while remaining compact for use. Other variables may include wave conditions, line diameter, and line material which can be modified for the system's buoyancy requirements in offshore fishing environments.

When a flotation device is fully submerged, the tension in the vertical line will be equal to the total buoyancy of the buoy. By selecting a flotation device size that is larger than required, it is possible to look at the tension in the line relative to various parameters to obtain an understanding of the forces involved. At the edge of the Gulf Stream, surface water currents can be as high as 2 knots (1 m/s). In the comparison of vertical line tension versus water currents for a fixed length of line, a significant increase in line tension results from an increase in water currents. As shown in Table 1, the last result (denoted with *) closely matches observed tensions in offshore waters where a flotation device with 180 lbs of buoyancy easily become submerged in currents in the range of 2 knots.

TABLE 1

Comparison of vertical line tensions for various vertical line lengths.

| Vertical Line Diameter (in) | Vertical Line Length (m) | Water Currents (m/s - Surface, Bottom) | Wind Speed (m/s) | Waves Amplitude (m), Period (s) | Max Line Tension (N) | Max Line Tension (lbs) |
|---|---|---|---|---|---|---|
| 0.5 | 600 | 0.2-0.1 | 5 | 0.5, 7 | 80 | 18 |
| 0.5 | 600 | 0.4-0.1 | 5 | 0.5, 7 | 150 | 34 |
| 0.5 | 600 | 0.6-0.15 | 5 | 0.5, 7 | 310 | 70 |
| 0.5 | 600 | 0.8-0.15 | 5 | 0.5, 7 | 500 | 112 |
| 0.5 | 600 | 1.0-0.2 | 5 | 0.5, 7 | 770 | 173* |

As a result of these strong currents, offshore fishermen generally use 600 m to 900 m of line in waters of 300 m depth to try to prevent their surfaces floats from becoming submerged. In the comparison of vertical line tension for various line lengths, shown in Table 2, it can be seen that line tension decreases significantly as the line length in increased. In 300 m of water with 1 m/s of surface current and 750 m to 900 m of line length, the tension decreases below the 180 lbs of buoyancy that the flotation device provides, allowing the flotation device to remain on the ocean surface.

TABLE 2

Comparison of vertical line tensions for various wind speeds.

| Vertical Line Diameter (in) | Vertical Line Length (m) | Water Currents (m/s - Surface, Bottom) | Wind Speed (m/s) | Waves Amplitude (m), Period (s) | Max Line Tension (N) | Max Line Tension (lbs) |
|---|---|---|---|---|---|---|
| 0.5 | 450 | 1.0-0.2 | 5 | 0.5, 7 | 875 | 196 |
| 0.5 | 600 | 1.0-0.2 | 5 | 0.5, 7 | 770 | 173 |
| 0.5 | 750 | 1.0-0.2 | 5 | 0.5, 7 | 650 | 146 |
| 0.5 | 900 | 1.0-0.2 | 5 | 0.5, 7 | 580 | 130 |
| 0.5 | 1050 | 1.0-0.2 | 5 | 0.5, 7 | 500 | 112 |

In the comparison of vertical line tension for various wind speeds, shown in Table 3 below, the line does not show a significant change in line tension as the wind speed is increased. The water currents appear to be the main driver in changes in tension.

TABLE 3

Comparison of vertical line tensions for various wave conditions.

| Vertical Line Diameter (in) | Vertical Line Length (m) | Water Currents (m/s - Surface, Bottom) | Wind Speed (m/s) | Waves Amplitude (m), Period (s) | Max Line Tension (N) | Max Line Tension (lbs) |
|---|---|---|---|---|---|---|
| 0.5 | 600 | 1.0-0.2 | 5 | 0.5, 7 | 770 | 173 |
| 0.5 | 600 | 1.0-0.2 | 10 | 0.5, 7 | ~770 | ~173 |
| 0.5 | 600 | 1.0-0.2 | 15 | 0.5, 7 | ~770 | ~173 |

Two results can be seen in the comparison of vertical line tension for various wave conditions, shown in Table 4. Here the line diameter has been increased. Comparison to previous results shows an increase in vertical line tension as the line diameter increases due to the added hydrodynamic drag. Additionally, it is apparent that as the wave amplitude is increased a small increase in vertical line tension is generated.

TABLE 4

Comparison of vertical line tensions for various wave conditions.

| Vertical Line Diameter (in) | Vertical Line Length (m) | Water Currents (m/s - Surface, Bottom) | Wind Speed (m/s) | Waves Amplitude (m), Period (s) | Max Line Tension (N) | Max Line Tension (lbs) |
|---|---|---|---|---|---|---|
| 0.75 | 600 | 1.0-0.2 | 5 | 0.5, 7 | 880 | 197 |
| 0.75 | 600 | 1.0-0.2 | 5 | 1.0, 7 | 930 | 209 |
| 0.75 | 600 | 1.0-0.2 | 5 | 1.5, 7 | 950 | 213 |
| 0.75 | 600 | 1.0-0.2 | 5 | 2.0, 7 | 1000 | 224 |

Based on these data, it is possible to design a system that can withstand the conditions experienced by fisherman in the offshore fishing environment with their existing gear. For example, generally current fishing gear requires about 180 lbs of flotation to bring the line to the surface, but sometimes with strong currents, even 180 lbs of flotation is pulled underwater by the tension on the rope. The on-call system described herein takes into account these considerations in order to provide an improved fishing gear system.

FIGS. 2-3 are schematic illustrations of one embodiment of the line cartridge removably joined with the spool assembly. As shown in FIGS. 3-4B, the spool assembly is comprised of a central portion, also referred to as a core, with an end cap or another suitable means to prevent the line from unraveling from the core disposed on either end of the core. A gear detector may be attached to the spool assembly. In this embodiment, the core is cylindrical to accommodate the wrapping of a line or cable about the core. In some constructions, the end caps are generally circular and have sufficient strength such that the spool assembly can be placed on its side and rolled similar to a barrel.

Flotation Device and Core

As mentioned previously, modularity is a key aspect of the present invention as it translates to a scalable and highly adaptable system that can be used in deeper waters but also modified for shallower waters. The design of the flotation device as a multi-piece cylindrical core, at least in part, contributes to this modularity. In many embodiments, the core includes the flotation device and provides the buoyancy needed to raise the releasable portion of the present modular system plus a sufficient quantity of the line to the surface in addition to providing the means to receive and retain the line before and during deployment. In other embodiments, the core only holds the line and a separate flotation device raises the line to the surface. In certain embodiments, the line itself is wrapped with the addition of a binder such as a mastic-type material to at least one layer of the line to temporarily hold the line together while it is removed from a first mandrel-type winding fixture, which may be collapsible as described in more detail below in relation to FIGS. 14A-14D, and then loaded onto a separate floatation device.

The core, also referred to herein as the central portion of a spool assembly according to the present invention, is comprised of one or more sections to produce a form adapted to hold (e.g., contain, wrap, secure) the line until the line is intentionally released into the water column. FIGS. 3 and 4A depict the outer portion of core 122 comprised of two sections 152, 154 of flotation device 150 which may be connected to form the cylindrical (or other suitable shape) profile. In other constructions, the core is a single section. As can be inferred by comparing FIGS. 4A and 5, many core configurations have at least a partially hollow center or a hole disposed within the core which allows additional components (such as the housing 220, FIG. 5, with a controller 230 and/or other electronics and/or electro-mechanical devices) to be integrated into the center of the core. In another embodiment, the flotation device at the core is an inflatable unit which may be inflated prior to deployment or inflated when the line is to be released to the surface for gear retrieval.

In some embodiments, the core includes multiple layers of stacked buoyancy material which allows the user to easily modify the height of the core (FIGS. 3-4A). The layers may be permanently sealed together using an adhesive or another substance to prevent water from entering the space in between each layer. Also, the layers may be compressed together without an additional substance disposed between the layers; in such case, the user may disassemble the spool assembly and remove one or more layers of the core to modify the core's dimensions.

Manufacture and design of the core is determined by several factors, including system buoyancy modeling. Adequate buoyancy is often necessary to operate in the offshore fishery environment where strong surface currents and undertow and deep water depths requires increased flotation to off-set the weight of the line (which can easily be on the order of 140 to 180 lbs or more) and reliably bring the line to the surface. It is an object of the present invention to provide a system which may be adapted for various types, lengths, and thicknesses of line as the desired operation dictates. Use in deeper water requires longer and more robust line which is generally greater in thickness and strength.

Thus, the core design preferably accommodates these buoyancy considerations while maintaining a compact size that is manageable for the user. In many embodiments, the core is positively buoyant which allows the system (or part of the system) to float to the surface when the release mechanism is actuated. In other embodiments, the core is not positively buoyant and may be neutrally buoyant or in some cases negatively buoyant to ensure the spool assembly with line cartridge remains submerged. The system may use another buoyancy means or flotation device to bring the line to the surface for gear retrieval instead of a buoyant core such as a buoy or other suitable float.

The core may be comprised of any suitable material preferably material of enough strength to resist deformation during operation particularly under the pressure experienced in deep water. More specifically, the core is preferably made of material which can withstand the pressure forces of depths up to 450 m or more in some cases (e.g., material rated to depths of 500, 550, 600, 700, 750, 800, 1,000, and 2,000 m). The modular nature of the core design allows for scalability and accommodation of a variety of different environmental parameters without having to modify the entire design. For example, if a lighter weight system were required to operate in shallower waters, the core material could simply be swapped out for a lower density material to reduce the overall weight while increasing the available buoyancy. This allows the user to change one component rather than the entire system which is the case in some of the existing on-call systems.

In many embodiments, the core is comprised of a buoyant material such as foam, syntactic foam, cardboard, rubber, synthetic rubber polymers, and any material which has a specific gravity less than that of the surrounding medium (e.g., water, seawater). For example, a less-dense or more-dense material could be used to increase buoyancy or increase line capacity, respectively. In some embodiments, the core may be comprised of one or more sections wherein each section is made from one or more materials to meet the buoyancy and/or strength requirements of the system. In one embodiment, the core is comprised of sheets of Divinycell™ HCP-70 Hydraulic Crush Point closed cell foam manufactured by DIAB to keep the overall weight of the system down and the available buoyancy up. HCP-70 is a low density foam that has an operational depth rating of 450 m and a crush depth rating of 700 m. Materials of similar ratings may be used as well. Utilizing a low density foam also keeps the overall size of the system smaller than would otherwise be possible. Lower density foams are available but at the cost of reduced operating depth.

Air-filled flotation mechanisms for the core or flotation device are also possible but ultimately prove to be a source of risk in terms of fabrication costs and reliability. Some other similar systems like the FioBuoy by FioMarine, Australia, use a plastic air-filled housing as the primary flotation mechanism, but are limited in the operational depth that can be achieved in terms of physical strength and line capacity, require a completely different assembly, and have limited buoyancy of approximately 18 lbs for the 200 m model.

In one construction, the core is designed to accommodate a line cartridge containing up to or approximately 900 m (or less) of ½" diameter neutrally buoyant or other suitable line. The overall spool assembly dimensions are approximately 32" diameter by approximately 43" tall. The spool assembly weighs approximately 130 lbs in air unloaded and as much as 340 lbs in air when fully loaded with 900 m of ½" line. The available buoyancy of the system as built in this construction is 145 lbs. In some embodiments, positively buoyant line is used as added buoyancy at the cost of requiring a heavier anchor or heavier load (e.g., traps). Larger diameter lines may also be utilized at the cost reducing the total line length that the line cartridge can support. In these embodiments, the anchor is attached to the load proximal to the release mechanism, such that the anchor remains with the load after the release mechanism is triggered and the flotation device is released to the surface.

In another embodiment, the spool assembly is less than 100" in height, preferably less than 90", 80", 70", 60", 50" and, in some constructions, is less than 40" in height. Additional spool assembly designs may approximately or less than 30" in height. The overall diameter of the core is preferably retained to a reduced size while still meeting the necessary buoyancy requirements of the system. In many cases, the overall diameter of the spool assembly is generally less than 100", and preferably less than 90", 80", 70", 60", 50", 40", and 30" in diameter. In some cases, the core diameter is less than 25", 22", 20", 19", and 18". However, the height and diameter dimensions are subject to the specific operating depths. In a specific embodiment, the spool assembly is approximately 30" in height and 32" in diameter.

In many cases, it is preferable to employ a spool assembly with a cylindrical (e.g., tubular) core. This design easily accommodates the longer lengths (and greater thickness and/or strength) of line that are required for deeper water operation (e.g., 300 m or greater depth).

The main body of core comprises a surface area SA wherein the surface area SA is adapted to receive the line usually in circumferential loops (e.g., layers) around the core. In some embodiments, the core is grooveless (e.g., smooth) to accommodate different types and sizes of line wrapped about the core. In other embodiments, the core is grooved to assist with symmetrical line loading/wrapping. The grooves, lips, or ridges may be provided can be cast on the core or machined as separate pieces that are mechanically affixed to the core. The grooves are generally slightly larger than the line in use to avoid pinching and allow line to adjust itself to the curvature of the core.

In some cases, an additional binder substance is applied to the line during or after wrapping the core to further secure the line on the core. As the line commonly wraps around the core in layers to be as compact as possible, the binder substance may be applied to any layer of the wrapped line or to each layer or may be applied to a single layer such as the outermost layer, first layer of wrapped line, or to the core itself via surface area SA. This may temporarily glue, fasten the line in place, or may provide a less slippery surface for the line to wrap about, which allows the system to wrap line in a space-efficient manner and contain longer lengths of line. Some embodiments employ a mastic or adhesive on one or more (e.g., all layers) layers of line to secure the line wraps in place before the next layer of line wraps is added onto the core. Silicone adhesive and substances of similar properties are often used as the mastic, although alternate substances such as biodegradable cornstarch-based mastics are suitable as well.

In terms of handling, the empty spool assembly (and/or a separate flotation device) come to the surface first, are recovered by the fishing vessel, and then the fishermen haul the trawl as normal. Getting the spool assembly on board and out of the way earlier in the process also provides time while the trawl is being recovered to reset the line cartridge and prepare it for redeployment.

One method according to the present invention enables reloading of a retrieval system according to the present invention. The method includes selecting a quantity of line having a length greater than the selected depth, and forming the line into a toroid including applying a binder to at least a portion of the toroid. The method further includes providing the toroid to a user with a retrieval system having a spool assembly with a frame for carrying the toroid in combination with a flotation device.

Other line cartridge and spool assembly designs are envisioned. In other embodiments of the system, the line cartridge is a container to hold the line. This container may be any shape or size to accommodate the amount of line. In some embodiments, the line cartridge is a bag or a soft receptacle designed to hold the line inside. In other embodiments, the line cartridge is a solid receptacle or a case which holds the line inside. In several cases, the container is buoyant to bring the line to the surface when the release mechanism is engaged. In other cases, the line cartridge is a container which holds the line and a separate flotation device (e.g., buoy, float) which are both released from the container to reach the surface while the line cartridge remains submerged. However, additional care must be used to reduce the potential for line tangling/release failure; if the line is packed too tightly inside the container, the line may not be released or may only partially release. This design may be better suited for on-call systems adapted for inshore waters to reduce complexity and cost.

When using a container as the line cartridge, the line is often coiled in a container. Upon release, the line is pulled from the container via the buoyant container or the flotation device. For relatively short lengths of line (e.g., less than 600 m, 400 m, 300 m, 200 m, 150 m, 100 m, 50 m), freely-packed line containers can work well with an appropriately chosen line, such as torque-free braided ropes. For large lengths of line (e.g., 600 to 900 m) however, a freely-packed line container would become increasing large, increasing the danger of tangling and release failures. Line containers cannot be packed too loosely, because the rope can move and tangle inside the canister due to water motion. Line containers also cannot be packed too tightly, because the line might not successfully pull out of the canister. Additionally, since the container would remain relatively close to the trawl anchors, the container could potentially increase the difficulty of retrieving the trawl anchors on board the fishing vessel. One of the largest cautions is the care required in coiling the line in the container. Any sort of improper twist in the line, knots, or slack in the packing could create potential tangles in the line, preventing the float from reaching the surface.

In embodiments employing a flotation device, any device with appropriate buoyancy may be used. In certain embodiments, buoys such as 14" trawl floats (or other sizes) are attached on top of a line container and/or the spool assembly. Trawl floats are inexpensive and readily available. However, the amount of flotation required for the operational area of interest due to the depth and water currents would have required multiple trawl floats, making the overall size of the system unwieldy, whether as a single component or as two separate components as in a typical mooring arrangement.

End Cap

The spool assembly typically has at least one end cap disposed on an end of the central portion, and typically an end cap is disposed on each end (i.e., on the upper portion and the lower portion) of the spool assembly such as shown in FIGS. 2-4B. The end cap serves several purposes: (1) it prevents the line from unraveling off of the core or from shifting substantially in position on the core; (2) it allows the system to sit upright to take up only a small footprint of space on deck; and (3) it provides a manageable handle for the user during deployment and retrieval; and (4) it protect the release mechanism (and the acoustic transducer, in some embodiments).

FIG. 3 illustrates the modularity of the on-call system wherein the line is arranged on the body of the core of the spool assembly and a first end cap and a second end cap are disposed on either end of the core. The end cap is generally attached to the spool assembly either directly or by way of a plate such as the lower spine plate using suitable attachment means such as bolts, pins, screws or the like. In some embodiments, the end cap includes a threaded portion arranged to engage the spool assembly by screwing onto the spool assembly or any other surface interfacing the spool assembly. In some embodiments, the end cap is connected to the internal spine. While the end cap may be permanently secured to the spool assembly via welds or other permanent attachment means, the end cap is preferably removable (e.g., interchangeable, replaceable, detachable). This is meant to facilitate preparing the on-call system for redeployment by exchanging either the line cartridge or the line or to facilitate repair/modifications to the controller or other system components.

The lower end cap comprises two primary surfaces: a spool assembly interface and an outer interface. The spool assembly interface of the end cap contacts the spool assembly either directly or via another surface such as the lower spine plate. The outer interface is capable of contacting the surface of the deck if placed in an upright position. Further design preferences favor an on-call fishing system that does not roll around on the deck, which can be hazardous for the user especially in the rough water conditions experienced in offshore waters. Thus, the outer interface of the end cap preferably should sit flat on the deck of the fishing vessel. In such embodiments, the spool assembly interface of the end cap connects to an end portion of the core or central portion of the spool assembly. The core interface of the end cap is further intended to provide a smooth surface to secure the line pack and provide an uninterrupted pay-out path for the line.

In some embodiments, at least one end cap is arranged to support a gear detector, as shown by gear detector GB, FIGS. 2 and 4B. In some cases, the gear detector is directly connected to the outer interface of the end cap. Other cases allow the gear detector to be mounted on the outer surface while connected to the line cartridge and/or the spool assembly. Preferably, the gear detector does not substantially project above the end cap so it is less likely to be damaged during handling.

Most existing release mechanisms have a relatively large profile, extending significantly beyond the end cap. Using an existing release mechanism with the requirement of sitting flat on the deck would have required a larger line spool cage, in turn increasing gear handling difficulty for the fishermen. To maintain as compact a system as possible, the external release components were designed with consideration to the end cap design to have a lower profile than existing releases.

The end cap may be designed into a plurality of shapes and dimensions. In most embodiments, the end cap comprises an outer diameter greater than the diameter of the core. In other embodiments, the end cap comprises an outer diameter less than the diameter of the core.

While FIGS. 2-4B depicts the end caps as an annular shape, other forms are also acceptable including square, rectangular, ovoid, triangular, irregular, etc. as long as the function remains the same. Further illustrated in FIGS. 2-4B is one design of the end cap wherein the end cap comprises an internal annular member 135 with prongs inwardly projecting from the outer diameter rim 133 of the end cap 130 to this internal annular member. The precise positioning and number of the prongs may be varied as long as the overall strength of the end cap is not substantially diminished. Additionally, this end cap design or similar designs allow the user to easily and firmly handle the spool assembly by one of its ends.

The end cap is comprised of one or more materials adapted for use in an aquatic environment. The material is generally substantially corrosion resistant particularly when the system in deployed in the ocean. In many embodiments, the end cap is manufactured from metal of suitable strength to withstand rough handling without decreasing in fortitude or deforming to an extent to substantially impact use. Suitable materials include steel, stainless steel, steel or metal alloy, aluminum, titanium, iron, and other metals. In cases where a lighter weight model is preferred, the end cap can be formed from plastics such as thermoplastics, polyethylene, polypropylene or other plastics material.

Line and Line Cartridge

Referring to FIGS. 2-3, the line is typically contained by (e.g., wrapped around) the spool assembly until the line is released when the release mechanism is engaged. The line provides the means to tether the deployed system and trap on the seafloor to the surface where the line can then be reeled in to bring the system and trap onto the vessel. The line generally remains tethered to the spool assembly by one end and to the submerged trap by the other end in either a wound or an unwound state.

Although the line may be wrapped about the spool assembly via traditional means (i.e., by spinning the spool assembly and winding the line), it is an object of the present invention to provide a pre-wound line cartridge, also referred to herein as a line pack, which can be loaded onto the core of the spool assembly. This is most often accomplished by removing one of the end caps and sliding the line pack onto the core (FIGS. 3-4A). Once the line pack is loaded onto the core, the end cap can be reinstalled, securing the line pack onto the spool assembly. The exchangeable line pack is less burdensome and less time-consuming for the user than attempting to rewind the line back onto the spool assembly while on site. Furthermore, this method allows for quick turn-around on site for gear recovery and gear redeployment.

While several types of line may be used with the present system, the line is preferably matched to the intended operation in terms of water depth, water current strength, attached load (e.g., one or more traps), etc. When these considerations are taken together, the weight of the line is generally substantially heavier than existing on-call systems are capable of handling. For example, previously-demonstrated on-call fishing systems have a maximum buoyancy of about 38 lbs which is inadequate for deployment in deep water and high currents of the offshore fishing environment. In some embodiments, the on-call system is capable of providing at least 39, 45, 50, 60, 70, 80, 90, 100, 110, 120, 130, 140, 150, 160, 170, 180, 190, and 200 lbs of buoyancy to raise the weight of the line to the surface for gear retrieval. The buoyancy capability of these embodiments allow the system to raise trawls containing 1, 2, 3, 5, 7, 10, 20, 30, 40, 50 and more than 50 traps for lobster, crab or other catch. In some cases, the system is capable of providing greater than 200, 250, 300, 400, and 500 lbs of buoyancy. In a specific embodiment, the on-call system requires for line for deployment with the high currents and deep water of about 180 lbs of buoyancy for ½" line. Less buoyancy would be required for smaller line diameters.

Suitable line comprises several key characteristics for use with the present invention including, but not limited to, adequate strength to prevent line breakage when hauling up a desired load (which may include several dozen traps) from the seafloor, abrasion resistance to be able to withstand repeated deployment and hauling, limited elongation (e.g., less than 50%, 40%, 30%, 25%, 20%, 15%, 10%, 5% elongation of line length), rot/corrosion resistance, abrasion resistance, no loss of strength when wet, and the desired specific gravity. With consideration of these preferred specifications, a plurality of types of line may be employed with the present system. The line may be a woven cord, a rope, a wire, a cable, a rubber line, a plastic line, or any other types of line capable of use in the water and suitable for the desired application. In some embodiments, the on-call system uses ½" Hydropro line or an equivalent thereof.

Of particular consideration in the on-call system design is the scope. The scope refers to the ratio of total line (e.g., vertical line) to the intended water depth of use. As scope increases, more line is used and tension on the line decreases. For a system intended to be used in deep water, the line length must be increased at least to allow the line to reach the surface of the water for gear retrieval. However, increases in line length must be considered in the overall system design. Increased line increases the weight that the spool assembly must overcome in buoyancy. The spool assembly then needs to accommodate the wrapping of the increased length without the line unintentionally winding prior to actuation of the release mechanism which may change the spool assembly's physical dimensions and material composition.

Existing systems typically use a lower scope (shown in Table 6) which is typically easier to accommodate and is suitable for inshore waters. However, such scopes would be unsuitable for offshore water conditions in deeper water and higher currents; because the wave currents are significantly stronger offshore, systems without high enough scopes would easily have the gear pulled underwater, making gear retrieval very difficult or resulting in gear loss. The present invention has considered all of these aspects and determined the necessary scope to provide a system capable of deep water use to have a scope greater than 0.5:1, 1:1, 1.1:1, 1.2:1, 1.3:1, 1.4:1, 1.5:1, 1.6:1, 1.8:1, 2:1, 2.1:1, 2.2:1, 2.3:1, 2.4:1, 2.5:1, 2.6:1, 2.7:1, 2.8:1, 2.9:1, and 3:1. In preferred embodiments, the on-call systems comprises a scope of about 1:1 up to 5:1, more preferably about 2:1 up to 4:1, and in specific embodiments, preferably about 2:1 to 3:1.

The on-call system may use more than one type of line including buoyant or floating line, neutrally buoyant line, and sinking (e.g., negatively buoyant) line. In many embodiments, the system employs at least neutrally buoyant line. In other embodiments, the system uses at least uses buoyant line. In another embodiment, the system uses at least sinking line.

Line selection is important for creating a system that is robust enough for hauling as well as safe for the user. While thinner line is less susceptible to drag forces in the water, has a lighter weight, enables a greater length of line to be carried on a spool, and requires less buoyancy to bring to the surface, such line can easily cut through the user's skin. Thinner lines are also more hazardous for marine animals as it cuts into flesh upon entanglement. However, thicker diameter line is heavier, requires more buoyancy to bring the line to the surface, and becomes less compatible with gear hauling equipment as the diameter increases. Therefore, the line selection preferably takes these issues into account as well as the line length and hauling capacity.

In many embodiments, the on-call system uses line with a line diameter of at least ⅛", at least 3/16", preferably at least ¼", and more preferably about ½" outer diameter. Other line diameters may be suitable, including ⅜", 7/16", 9/16", ⅝", or greater depending on the intended operation as deemed suitable by one skilled in the art. In a specific embodiment, ½" line is set as the minimum line diameter for several reasons. The line diameter for trap hauler equipment is set by adjusting the separation of two steel plates; the line diameter setting is not easily adjusted. The sinking groundlines in a trawl can be up to 2500' (750 m) long, which would comprise roughly half of the overall length of line hauled in 300 m of water with a scope between 2:1 and 3:1 (600 m to 900 m of vertical line). Sinking groundlines gather sediment that abrades the rope fiber as it is forced between the hauler plates, and so offshore groundlines are typically ⅝" line to increase the longevity of the rope. The vertical line cannot have a dramatically smaller diameter than that of the groundline, since the trap hauler plates are not easily adjusted. As discussed previously, small diameter rope such as ¼" is a potential injury hazard for fishermen that can cause loss of fingers if the line breaks or comes off the trap hauler equipment. Therefore, ½" line is generally optimal for offshore fishing which, in turn requires higher buoyancy for the spool assembly flotation or other flotation device particularly when using line lengths as long as those necessary for deep offshore waters.

Release Mechanism

In order to allow the system to release the line into the water column at a specified time, the on-call system employs a release mechanism. The release system is used to decouple the floatation device from an anchor, which includes any anchoring means. When actuated, the release mechanism releases at least a portion of the buoyant floatation device of the system, including at least some of the line, so that it can rise to the surface for gear retrieval. The release mechanism comprises a means for mechanical advantage (e.g., force to release, work output based on input). Several methods are suitable for use with the on-call system. In most instances, the release mechanism is designed as a modular assembly which comprises a release assembly which is in communication with a controller and a power source. Furthermore, the release mechanism is capable of reacting to a release trigger to actuate the mechanism.

Continuing the description of the release mechanism 200 shown in FIG. 5 in a locked position, a support bracket 202 supports a release lever 204 having a hook 206 and an elongated shaft 207. To release an anchor, motor 214 rotates latch 216, extending through a release plate 222, in a clockwise or counter-clockwise direction as indicated by curved arrow 217. This releases intermediate lever arm 210 which pivots about pivot rod 211 in the direction of arrow 212 to release shaft 207 of lever 204, which then pivots about pivot rod 205 such that hook 206 moves in the direction of arrow 208 while shaft 207 moves in the direction of arrow 209.

In one construction, support bracket 202 is formed from two bracket plates defining a channel within which lever arms 204 and 210 rotate about pivots 205 and 211, respectively. The pair of bracket plates of bracket 202 may also be referred to as release cheek plates.

Figure 6A:
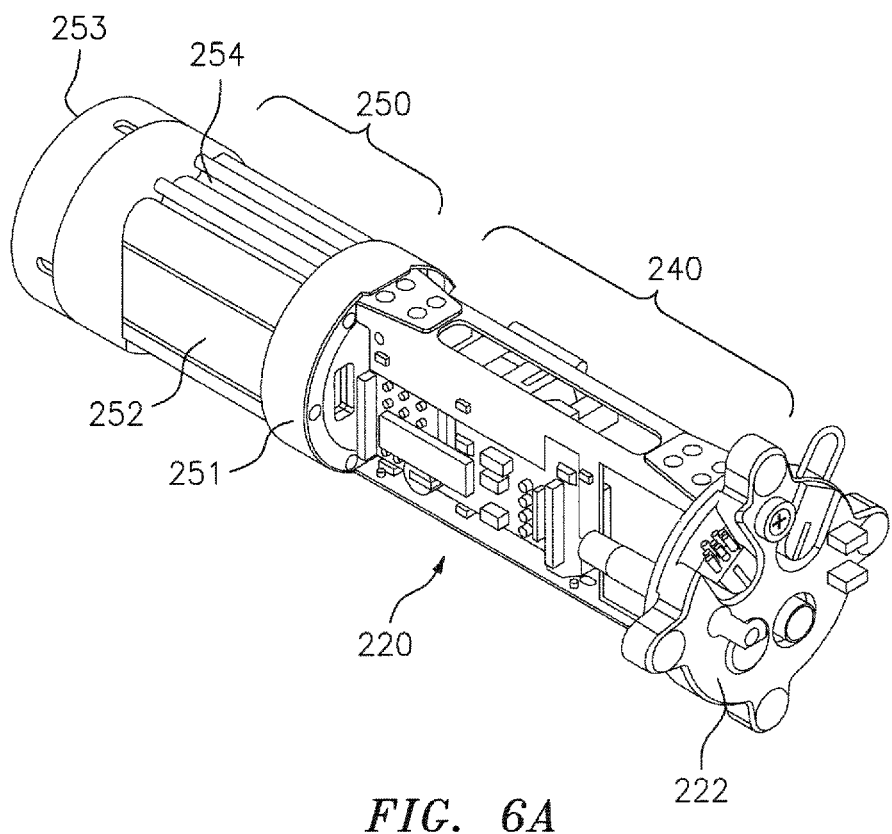
FIGS. 6A and 6B are schematic lower and upper perspective views, respectively, of the controller of FIG. 5 with rechargeable batteries, shown as connected upper and lower modules removed from the water-proof housing.
Figure 6B:
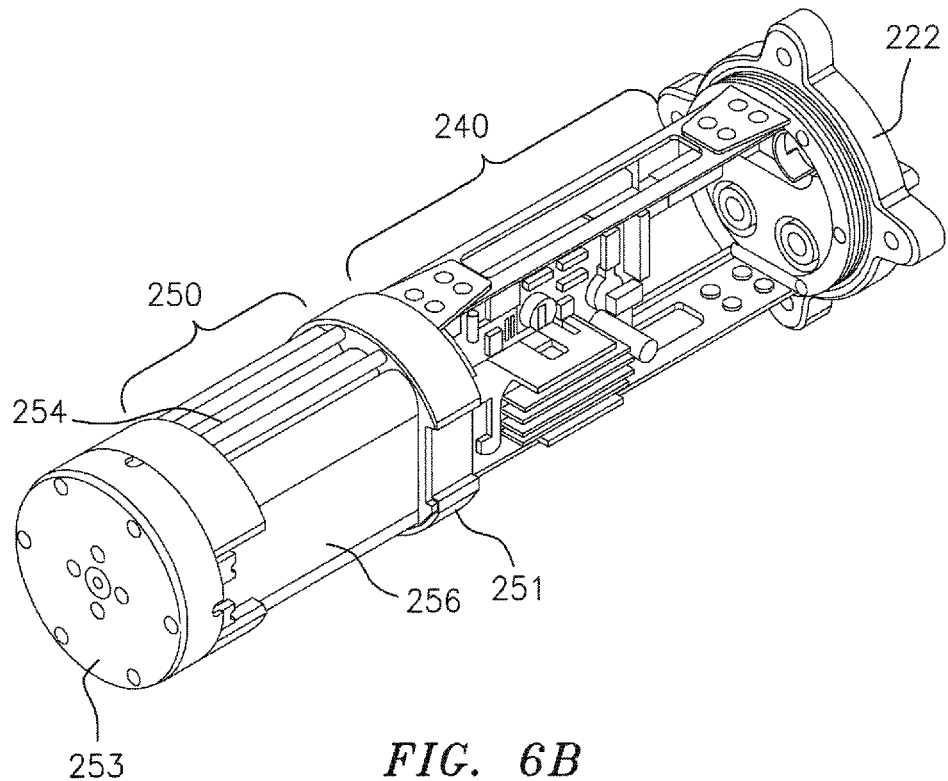

FIGS. 6A and 6B are schematic lower and upper perspective views, respectively, of the controller 230 of FIG. 5 including a control module 240 and a power module 250 with rechargeable batteries 252, 254 and 256, shown as removed from the water-proof housing 220. Also shown are release plate 222 with threads for engaging the housing 220, a battery pack socket 251, and a socket and charger mount 253.

Figure 7:
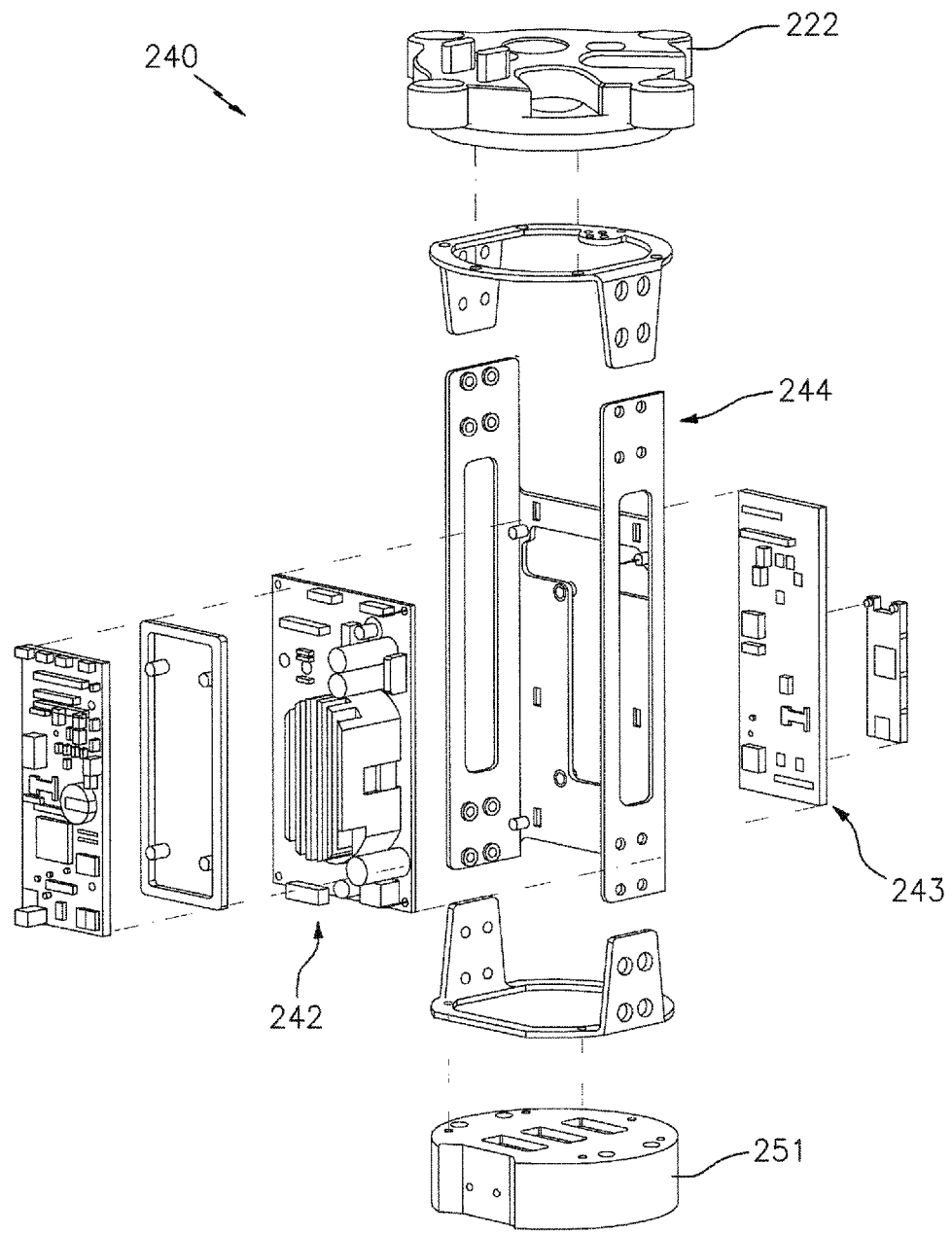
FIG. 7 is a schematic exploded inverted perspective view of a portion of the lower control module of FIGS. 6A-6B, with the release motor mechanism omitted.
Figure 8:
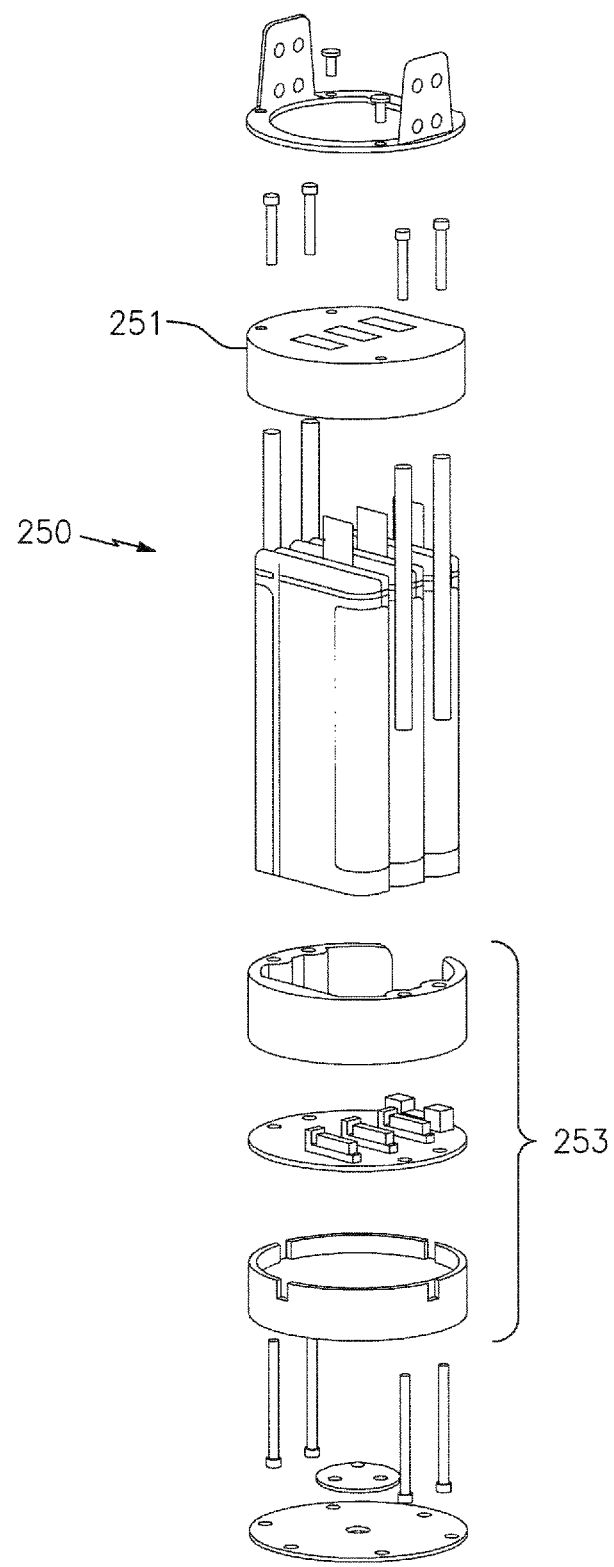
FIG. 8 is a schematic exploded inverted perspective view of the upper rechargeable battery module of FIGS. 6A-6B.
Figure 9:
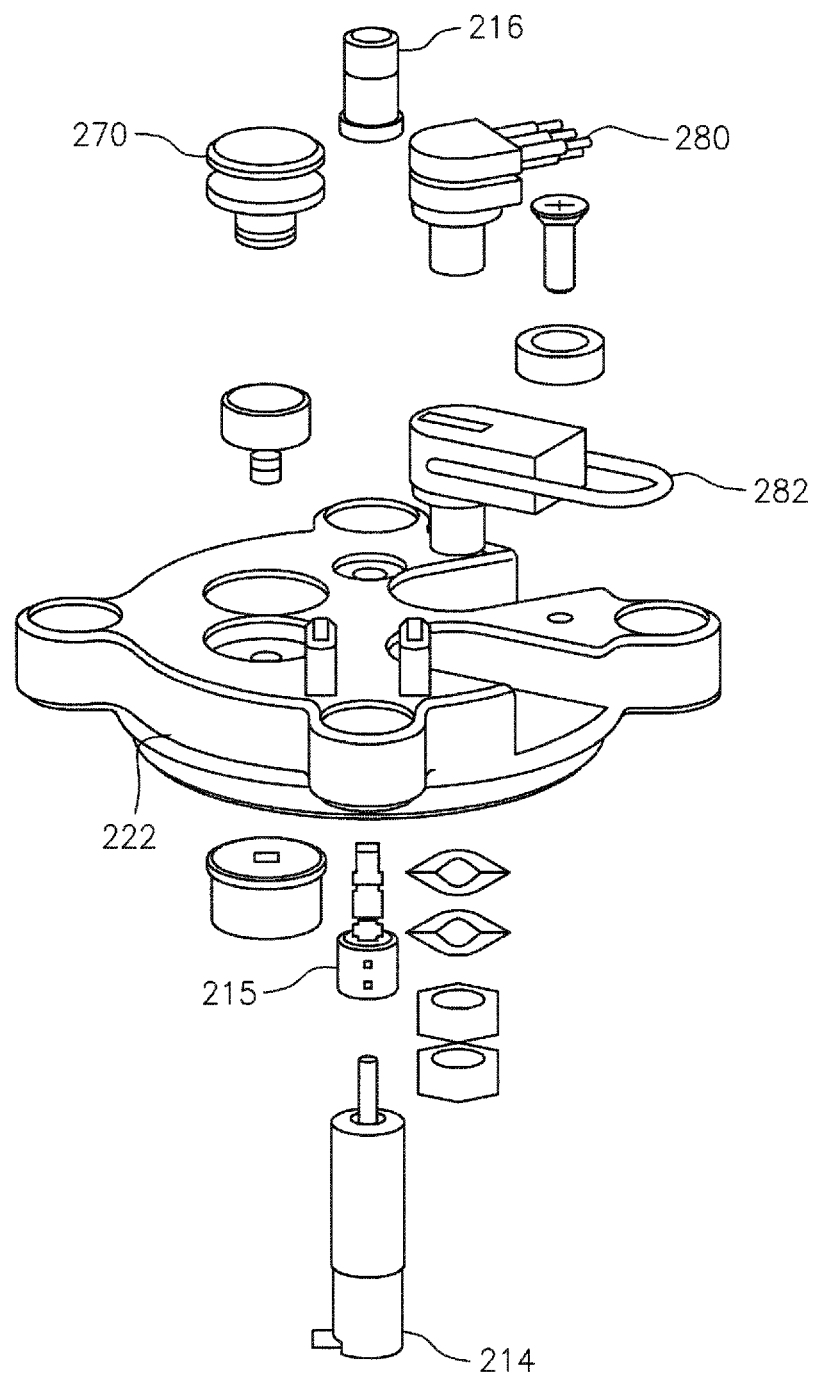
FIG. 9 is a schematic exploded inverted perspective view of another portion of the lower control module of FIGS. 6A-6B, which complements the view shown in FIG. 7 by illustrating the release motor on the upper side of a release plate with a release latch on the opposite, lower side of the release plate.

Most fasteners have been omitted from FIGS. 7-9 for clarity of illustration. FIG. 7 is a schematic exploded inverted perspective view of a portion of the lower control module 240 of FIGS. 6A-6B, with the release motor 214 and related mechanisms omitted. Circuit boards 242 including a microprocessor and an interface board 243 are mounted on chassis 244. FIG. 8 is a schematic exploded inverted perspective view of the upper rechargeable battery module 250 of FIGS. 6A-6B.

FIG. 9 is a schematic exploded inverted perspective view of another portion of the lower control module 240 of FIGS. 6A-6B, which complements the view shown in FIG. 7 by illustrating the release motor 214 with spindle adaptor 215 on the upper side of the release plate 222 with a release latch 216 on the opposite, lower side of the release plate 222. Also shown are a viewport 270, a male plug 280 and a female receptacle 282.

In many embodiments, the controller and the power source are generally secured in a housing (e.g., pressure housing) to protect the electronics for submerged conditions. The controller is in communication with the release assembly, and the release assembly responds to a signal, referred to as a release trigger, to release the system (or at least the line) to the surface. Upon deployment of the on-call system, the release assembly remains secured to the anchor and the load (e.g., trap, trawl, or other submerged device to be retrieved) and maintains the low profile of the system in the water column (i.e., no vertical lines). When the system is to be retrieved from the water, the release mechanism actuates the release assembly to release from the anchor, and the line is raised to the surface in many cases by the spool assembly or by another flotation device. In more detailed embodiments, the controller, in reaction to the release trigger, actuates the release assembly to release.

The release assembly comprises the mechanical components (e.g., means) of the release mechanism to release the line for gear retrieval. In many embodiments, the release assembly comprises several components including one or more spine plates, one or more release plates, one or more levers, and a release latch. As shown in FIG. 6, a spine plate interfaces with the housing and the release assembly components wherein the controller in the housing may directly (or indirectly) engage with the release assembly. The release plate(s) generally attached to the spine plate and in engagement with the lever(s) to form a load attachment point. The term "load" in this context refers to the overall downward force exerted by the negative buoyancy of at least an anchor or other weight that counters the positive buoyancy of the flotation device, as that downward force is experienced by the release mechanism. The lever(s) further engage with the release latch which is connected to a motor or other mechanical means to provide the motive force to engage the release mechanism.

In certain embodiments, the load is attached in the hook of the lower lever arm and the release plate(s), referred to as the load attachment point, forcing it to rotate clockwise about its pivot. The top of the lower lever arm makes contact with the upper lever arm forcing it to rotate counter clockwise about its pivot. The end of the upper lever arm makes contact with the release latch attached to the motor shaft or other motive force. When the motor shaft rotates the release latch, the upper lever arm is free to rotate, allowing the lower lever arm to rotate to release the load. In one specific embodiment, the mechanical advantage (i.e., ratio of the output force produced by a machine to the applied input force) of the release mechanism is approximately 300:1, requiring only a small amount of torque from the motor to rotate the release latch. Requiring less torque requires less battery capacity and smaller electronic components sizes, and allows for a reduced packaging footprint. In other embodiments, the release mechanism has a mechanical advantage of at least 1:1, 2:1, 10:1, 20:1, 30:1, 40:1, 50:1, 60:1, 70:1, 80:1, 90:1, 100:1, 150:1, 200:1, 250:1, 300:1, 350:1, 400:1, 500:1, and up to 1000:1.

A spine assembly supports the on-call system by providing a framework which includes means for attaching the end caps and additional components such as the gear detector or release mechanism, as desired. The spine assembly is typically a rigid form such as a rod, a plate, a strut, a brace, or other suitable structural member capable of resisting deformation. The spine assembly may comprise one or more supports, preferably 2 supports, but may comprise up to 3, 4, 5, 6, 8, 10, or more supports. These supports are often internally disposed in the spool assembly (as shown in FIGS. 4A-5), but may be external to the spool assembly (embedded external on the core) if still capable of providing the necessary support and attachment of the system and components. In some embodiments (as shown in FIG. 3), the spine assembly comprises 2 supports, preferably metal or other rigid material, which extend the length of the spool assembly and are disposed inside the core. In many cases, the supports attach to one or both of the spine plates which allows the spine plate to manage the load forces rather than the housing as it does in a traditional mooring designs. In other embodiments, the supports attach to either the release mechanism or bottom end cap and to either the top end cap or gear detector.

The release assembly components, such as the spine plates, release plates, and levers, are typically shapes that can be cut on a water-jet or comparable machine to keep component costs down. By making the design modular, the assembly is easily modified to other designs to change the overall profile of the release mechanism. The scalability of the design allows for flexibility in packaging size and mechanical advantage needs. One key design aspect includes constructing the spine plate to be load-bearing. Transferring the load forces from the housing onto the spine plate expands the design possibilities of the housing in terms of size and material.

The release assembly is further designed to easily detach from the end cap (e.g., bottom end cap) attached thereto. This end cap (and most often both end caps) can be quickly removed via detaching the attachment means (e.g., bolts, nuts, fasteners) securing the spine plate and the end cap to allow a pre-wound line pack to be loaded onto the core. Once the new line pack is loaded onto the core, the end cap can be reinstalled with attachment means, securing the line onto the core.

The release mechanism can employ any suitable method to attach to the anchor and to release from the anchor including, but not limited to, burn wires, solenoids, motors, or other mechanical means. Many embodiments utilize a motor such as a gearhead motor (e.g., DC gearhead motor) and in many cases an attached rotary encoder (e.g., shaft encoder, transducer) which converts the angular position or motion of a shaft or axle to an analog or digital code. The motor is attached to a motor shaft that secures one end of the upper lever arm while the lower lever arm secures the load. Once the motor is energized, the motor shaft rotates a key that prevents movement of the lever arms. Once the key is no longer an obstruction, the lever arms are free to move and the load is released. By monitoring the encoder signals as the motor is energized, it can be determined if the motor is moving as commanded. The motor state can be reported back to the user even when the system is remote (if properly equipped, for example with acoustic communications). The motor can also be commanded to rotate multiple times or in opposing directions in the event that the key is obstructed in one orientation but not the other.

In other embodiments, the release mechanism employs one or more solenoids which are frequently used in acoustic releases. The solenoid usually restrains one end of a lever arm or other means preventing the release mechanism from activating until desired, such as with a spring-biased locking mechanism, while the other lever arm secures the assembly to the anchor or other load. An electrical current is supplied to the solenoid causing the solenoid shaft to unlock the mechanism. To overcome potential biofouling or corrosion that may have accumulated on the release lever or restraint catch, a powerful spring is often incorporated into the mechanism inside the housing to ensure that the restraint catch successfully frees the upper lever arm. Once the end of the lower lever arm is free to move, attachment of the flotation device to the load is released. Rotary and linear solenoids are used commonly in the industry with high reliability. However, the size and "one-shot" (single attempt) nature of the devices may not be suitable for all applications. Increased release mechanism sizes require larger housing, and one of objects of the invention was to keep the system size to a minimum. In the event of the release mechanism getting fouled and not releasing on the first attempt, a one-shot device does not allow for a remote reset. A manual tool is often required to reset the device.

In additional embodiments, the release mechanism comprises a burn wire. Burn wires use an electrical current passing through a wire exposed to seawater that causes it to corrode. The burn wire is often used to secure the end of a lever or other means. Once the wire corrodes away, the lever arms (or other means) are allowed to move freely and release the load hanging from its other end. While burn wires are elegant because they are inexpensive to replace, they do require that stock is kept on hand.

Controller

The primary objective in electronics design for the controller is to provide a robust release driver capable of actuating the release mechanism at a specified release time and/or upon command (e.g., external signal). The controller provides the means of actuating the release mechanism via a release trigger.

As shown in FIG. 7, the controller is most often disposed within a housing to protect the system's electronics from the conditions in the field. In terms of depth usage, the housing's depth rating may be less than the depths of intended use. For example, the housing may be rated for use to depths of up to 100 m, but is intended to be used with the system to 300 m. Because the housing is secured within the core of the spool assembly, the core provides an extra layer of pressure tolerance which allows a lower depth rated material to form the housing. In other embodiments, the housing is rated to at least the depth of intended use and preferably rated to deeper depths than intended use for an extra margin of safety. In some embodiments, the housing is rated to at least 10 m, 25 m, 50 m, 75 m, 100, 150 m, 200 m, 250 m, 300 m, 350 m, 400 m, 350 m, 500 m, 1,000 m, and up to 6,000 m or more.

In a specific embodiment, the release mechanism comprises a pressure housing such as an aluminum housing. Other pressure housings and housing materials may be used which have the appropriate depth/pressure rating and compact form such as metal, steel, stainless steel, thermoplastics, ceramic, titanium, or other suitable materials known in the art. In general, the housing accommodates the release mechanism assembly. The housing may further comprise a viewport which allows the user to see the controller's LED indicators without opening the housing. The viewport is often located near the end cap although it may be located at any position on the housing.

Many commercially available systems use their housing equivalent as a strength member with the full mechanical load of the system applied directly on the pressure housing. This adds cost and complexity to the housing design. In some embodiments of the present invention, the housing is mounted to the lower spine plate of the release assembly such that the applied load forces are transferred to the lower spine plate rather than to the housing. This allows for a smaller pressure housing, a wider range of suitable housing materials, and for further modification potential of the release components.

In many embodiments, the controller comprises at least one circuit board, typically several circuit boards, which may include namely a microcontroller circuit board (referred to as the microcontroller), a release driver board, a battery charging board, and a distribution board. The circuit boards may be stacked together to provide a compact controller. In addition, the housing and the electronics can immediately accept an acoustic modem and acoustic modem power amplifier in order to implement an acoustic release option in parallel, and in addition to the timer-based option that would remain active.

In many embodiments, the microcontroller circuit board that implements the user interface, the timer functionality, motor control, and acoustic signal detection for the acoustic release option. The microcontroller implements the user interface over a serial port such as an RS-232 serial port or the like for the transmission of data to and/or from the microcontroller. The microcontroller sets the release time (in systems employing a timer-based release) into a clock such as a micro-power battery-backed real-time clock. The clock may be programmed with a release time prior to system deployment, after system deployment during operation, or both depending on the needs of the user. In some embodiments, the clock is permanently set to release after a specified amount of time. In order to optimize battery consumption, the microcontroller is adapted to control the power supply to switch to a low-power "hibernate state" when not releasing or interacting with the user, preferably automatically and/or on command. Upon receiving a signal from the user, the microcontroller switches to an operating power state. In additional embodiments, the microcontroller controls the release motor and monitors its motor encoders (when adapted for encoded release), and includes analog signal conditioning circuits for an acoustic detector, preferably a low-power detector, to detect acoustic release commands from the user.

In a specific embodiment, the microcontroller is an ARM M4-based Atmel SAM4S, which includes hardware cryptographic support that would enable eventual cryptographic signatures that only authorized fishing vessels could release.

The release driver board is often a separate circuit board from the microcontroller that is quite simple and comprises a switchable power supply and a motor driver chip. The release driver board is typically a separate board for two reasons: first, to reduce risk for the system build, and second, to incorporate modularity. If a future version of the system uses a different motor or a different actuator (such as a solenoid or a galvanic burn wire), the only circuit board revisions required would be to revise the relatively simple release driver board, rather than having to revise the microcontroller circuit board hardware. In certain embodiments, the release driver board is in communication with the motor of the release mechanism or the alternate release means (e.g., solenoid, burn wire).

The controller design, in several embodiments, also includes several features to help evaluate and debug the release and spool assembly unspooling performance. In one embodiment, an orientation motion-sensor chip is integrated in order to record the motion of the on-call system's line cartridge and spool assembly through the water column to help diagnose system release failures. In addition, during operational use, the motion sensor enables the microcontroller to determine whether or not the line cartridge and spool assembly has successfully released from its low profile position, and hence whether or not to continue trying to actuate the release. A data memory slot, such as for a micro-SD memory card or similar data storage device, is included to record sensor measurements for diagnostic analysis.

Additional aspects of the electronics design include battery selection and battery controller, as well as provisions for an acoustic power amplifier and transducer in future revisions.

As previously discussed, the release mechanism may be timer-based, acoustic command-based, or a combination of both which each have specific advantages. The timer-based mechanism provides a reliable and cost-effective means to release the spool assembly from its anchor. However, the acoustically-commanded release mechanism is capable of providing release on demand, a feature that is highly desirable in the offshore fishing environment prone to severe changes in weather conditions or simply changes in the fishing schedule. In some embodiments, the controller is capable of actuating the release mechanism using a timer-based release trigger. In other embodiments, the controller actuates the release mechanism via an acoustic command release trigger. In further embodiments, the controller supports the capability for future software and hardware revisions.

The specified time of release mechanism actuation may be during a time period such that the line may be released into the water column at any point during that time period. This may be the case when the user wants the release mechanism to be actuated any time between the time period of a week, over a multiple day period, during a 24 hour period, during daylight, during nighttime, during a multiple hour period (e.g., 23 hr, 22 hr, 21 hr, 20 hr, 19 hr, 18 hr, 17 hr, 16 hr, 15 hr, 14 hr, 13 hr, 12 hr, 11 hr, 10 hr, 9 hr, 8 hr, 7 hr, 6 hr, 5 hr, 4 hr, 3 hr, 2 hr, 1 hr), during a period less than 1 hr (e.g., 50 min, 45 min, 40 min, 35 min, 30 min, 25 min, 20 min, 15 min, 10 min, 8 min, 6 min 4 min, 2 min, 1 min, 30 sec, 10 sec), or instantly. In other embodiments, the specified time is an exact time either pre-programmed into the controller or is the time when a release signal is signaled to the system by the user.

User Interface

The user interface allows the user to program, change, signal, and otherwise interact with the controller and control the specifications of the on-call system. While a plurality of interfaces may be used with the present invention, the user interface described below provides a simple and reliable method of communication between the user and the system. Preferably, the release of the system to the surface is configurable via a user interface.

In some embodiments, the user interface is implemented over a serial port (e.g., an RS-232 serial port). In a specific embodiment, the user interface is provided over an RS-232 serial port with parameters 19200 bits per second, 8 bit words, no parity, and 1 stop bit ("19200, 8N1"). In certain constructions, the system is password-protected to prevent activation by unauthorized users.

The first time the system is used, the clock needs to be set. In subsequent deployments, the user needs to re-arm the release mechanism and set the desired release time, then put the system in its low-power state until its release time (if not programmed to do so already). In further embodiments, the software can allow more complex behaviors, as well as allowing control over a Wi-Fi or similar wireless link from commodity smart phones (e.g., iPhone or the like) or computers that would reduce the cost of required deck gear.

In some embodiments, shown in Table 5, the user interface comprises a series of menu commands available to the user to interact with the system.

TABLE 5

| | User interface menu commands. |
|---|---|
| s | Status: Print current time, unit's acoustic command ID number, release time, armed/not armed status, and remaining battery voltage. |
| t | Time: Set current time. |
| i | ID: Set unit's acoustic command ID number. |
| c | Correction: Set motor encoder count correction to avoid release motor overshoot. |
| r | Release Time: Set desired release time. |
| a | Arm release. |
| h | Hibernate now: Go into low-power state to wait for release time or user interaction. |
| n | Release Now: For resetting mechanical release state. |
| v | Version: Display firmware version and hardware version numbers. |
| ? | Help: Display help menu. |

In some embodiments, the microcontroller is in communication with the user interface and provides hardware cryptographic support that enables cryptographic signatures that only authorized fishing vessels could release. Any fishing vessel could query an on-call system on the seafloor, which would then reply with an acknowledgment signal to alert the vessel that on-call gear is set in that location. The reply signal would need to be very short (hence a small amount of battery energy) so that repeated gear-conflict queries would not significantly deplete its battery. If the reply to gear-conflict queries consumed significant energy, a malicious fishing vessel could repeatedly query on-call gear to deplete its battery. Since the gear is designed to release when its battery is below a certain level to avoid permanent loss of gear, a malicious fishing vessel could potentially force gear to release by depleting its battery. By minimizing the energy consumed by the reply to a gear-conflict query, the goal would be to make a repeated-query gear theft attack to become extremely time consuming and more trouble than it is worth.

Power Source

The release mechanism further comprises and is connected to a power source which supplies power to the controller and to the other mechanical components involved in the activation of the release mechanism (e.g., motor).

The power source is most often a battery, preferably a rechargeable battery such as a Lithium-Ion rechargeable battery pack. In a specific embodiment, the system uses a 14.4 V rechargeable Lithium-Ion battery pack (Inspired Energy). The energy capacity of the battery (20.4 Amp-Hours at 14.4 V nominal) is more than adequate for a timer-based release. The battery is sized to provide approximately six months of battery life for a system with an acoustic release, where a low-power acoustic detector is running constantly, as well as occasionally transmitting short acoustic replies for gear conflict "ping" queries from other fishing vessels, or acoustic release commands from the gear's owner.

Preferably, the power source comprises an input port and is compatible with a battery charger with power distribution wherein the power source may be recharged through the input port without need to disassemble the system, particularly the housing. However, the housing may also be removed from the system so that the power source may be recharged if more convenient for the user. Besides adding to the ease of operation, the rechargeable battery is also important to minimize the number of times that the housing needs to be opened. Every time the housing is opened, O-rings and other sealing surfaces need to be handled carefully to prevent nicks, dirt, or inadequate O-ring lubrication from causing leaks. With a rechargeable battery, there is no need for the user to open the housing during routine operation. Furthermore, the power supply is generally protected against over-voltage, under-voltage, and reverse-voltage, and against incorrect battery connections.

Release Trigger

The release mechanism is actuated in reaction to a release trigger which is possible through a plurality of methods. Preferably, the release trigger is reliable to ensure that only at the user-specified time the release mechanism is actuated and that the activation is completed to allow the line to be released into the water column. In some embodiments, a timer-based release trigger is used with the on-call system to trigger the release of the line. The timer-based release trigger can be set such that the line is released for the user on the surface to retrieve the system when the fishing vessel is expected to be back on site.

In other embodiments, an acoustic release trigger is employed with the on-call system. Such a method allows the user to actuate the release mechanism by providing a signal to the system when gear retrieval is desired. In still other embodiments, the on-call system comprises a combination release trigger which is configured to allow a timer-based release trigger or an acoustic release trigger to actuate the release mechanism. Adding an acoustically-commanded release in parallel with a timer-based release allows increased flexibility to hauling times in the event of changing weather or changes to the fishing vessel schedule. The on-call system design includes provisions for straightforward integration of acoustic signal compatibility (e.g., an acoustic modem and transducer), and the existing microcontroller board preferably has the hardware capability to perform as a relatively simple low-cost, low-power acoustic modem.

Additionally, a galvanic timed release trigger is easily adapted for use with the present invention which uses dissimilar metals that corrode over time at a predictable rate. This rate is determined based on the salinity, temperature, and depth of the intended body of water for deployment. Galvanic timed release is a useful option when release time need not be precise (e.g., release time deviation of several hours) and is cost-effective.

Timer Release

A timer-based system provides a cost-effective method to reduce exposure of animals to vertical lines in the water column, without requiring more expensive acoustic deck gear on fishing vessels. Furthermore, timer-based releases can allow the line to be at the surface when the fishing vessel arrives on site, saving time by not having to wait for the system to float to the surface (on the order of 10 minutes acoustically summoned in 300 m of water depth). Nevertheless, an acoustic release is also preferable given the better on-site timing of gear retrieval that it provides for the user. The timer-based system typically employs a clock in communication with the controller.

Acoustic Release

The present invention is capable of using acoustic technology to actuate the release mechanism. The primary additions to the system include an acoustic transducer, acoustic receive/transmit electronics, signal-processing software, and potentially a larger power source. To ensure reliable communication in offshore waters, the acoustic transducer uses a wide acoustic beam pattern.

Traditional moorings have the acoustic release underneath the flotation spheres and are therefore subject to an acoustic dead zone, through which acoustic signals cannot propagate. The dead zone causes a loss of communication with the release in certain orientations, reducing reliability. Acoustic component positioning is considered in order to prevent such issues with acoustic communication with the on-call system preferably by positioning the acoustic transducer at any position on the system which allows acoustic signals to reach the user.

In some embodiments, an active acoustic query signal from a fishing vessel helps to reduce gear conflicts with on-call fishing trawls with a reply from the on-call system on the seafloor indicating that gear has been set in that location. If acoustic deck gear were acquired among fishing fleets operating in the same area, the acoustic reply from the on-call system can be integrated into displays, for example by showing the location, length, and compass heading of a trawl to reduce gear conflict.

Optical Release

In still other embodiments, the release trigger is based on optical communication to actuate the release of the system for gear retrieval. An optical communication modem, such as described by Fan et al. in U.S. Pat. No. 7,953,326, may be integrated with the on-call system.

Automatic Release

As many of the release triggers require electrical power to actuate the release mechanism, gear may be lost if no power is available. Thus, there should be a release trigger to actuate the release mechanism when power level (e.g., battery level) is critically low. In such cases, the release mechanism is actuated by the controller when the power level reaches less than 75%, 50%, 40%, 30%, 20%, 15%, 10%, and 5% or less.

In other embodiments, a powerless release trigger is incorporated with the on-call system, in some embodiments. When all power is lost to the on-call system, a mechanical release trigger actuates the release mechanism.

Parameter Release

In additional embodiments, the release mechanism actuates in response to a change in a parameter in the surrounding environment. In such cases, the system may include a sensor or transducer capable of detecting the parameter change and communicating a signal to the controller to actuate the release mechanism. Parameters of interest comprise salinity, pressure, temperature, strain, vibration, distance, refractive index of a medium (e.g., surrounding environment, sample), wave and current conditions, and any additional parameter known to one in related fields. In some embodiments, this is accomplished using a system such as that described in U.S. Pat. No. 9,441,947 by Kapit et al.

Command Release

The on-call system may adapted to receive signals from another device such as a vehicle (e.g., unmanned underwater vehicle (UUV), an autonomous underwater vehicle (AUV), a remotely operated vehicle (ROV), a submarine, a mini-submarine, a drone, a homing device, and any other device capable of delivering a signal both in and/or out of the water.

Gear Detector

Fixed fishing gear such as lobster pot trawls can have conflicts either with mobile fishing gear dragged over it, or with other lobster gear set on top of it. Fishing gear buoys on vertical lines usually provide visual cues for other fishing vessels that fishing gear is below. However, on-call fishing gear does not have a visual cue on the surface, which increases the likelihood of gear conflicts. In addition to surface buoys, other existing methods help reduce gear conflicts such as setting trawls consistent orientations (e.g., north-south) or shared fishing ground understandings (e.g., fixed gear set on particular agreed-upon LORAN (long range navigation) time-differences, and mobile gear dragged on different LORAN time-differences using GPS units to display legacy. LORAN locations).

The on-call system may circumvent these gear conflict issues through passive acoustic detectability. This method does not necessarily require an acoustic transmitter be installed on the system, but instead employs a fish-finding depth sounder. In some embodiments, the system uses a fish finding sounder such as the Vexilar SP200A T-BOX Sonar-Phone (http://www.sonarphone.mobi) which has a dual-frequency 83 kHz/200 kHz transducer with a 20°/40° beam-width or similar device.

Figure 10:
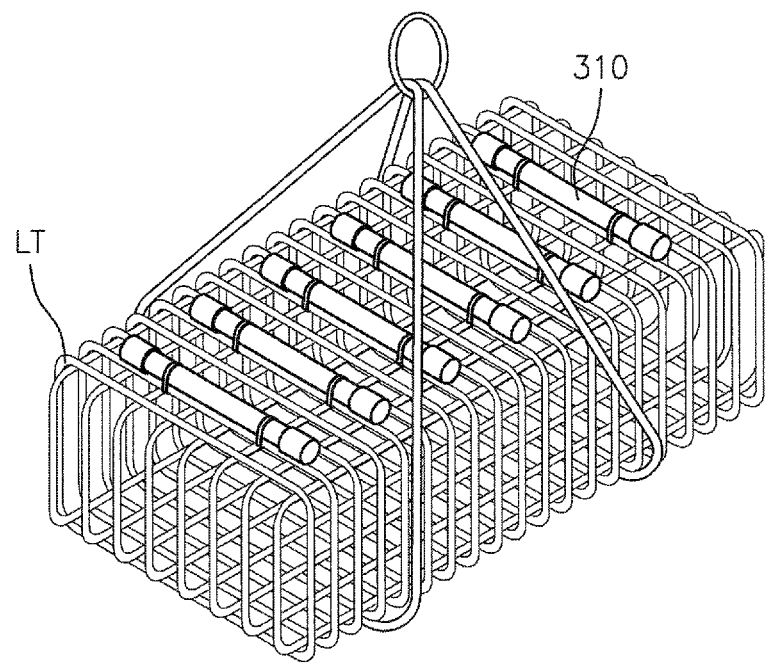
FIGS. 10-13 depict various types of acoustic reflectors positioned on a lobster trap, with FIG. 10 showing six spaced PVC pipe reflectors, FIG. 11 showing seven grouped metal tube reflectors, FIG. 12 showing a steel plate reflector, and FIG. 13 showing two trawl floats.
Figure 11:
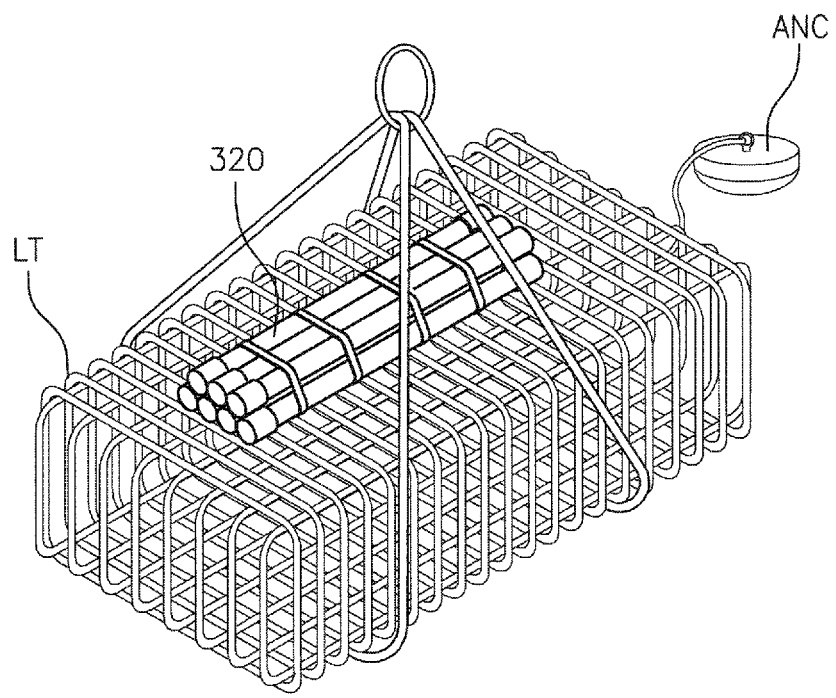
Figure 12:
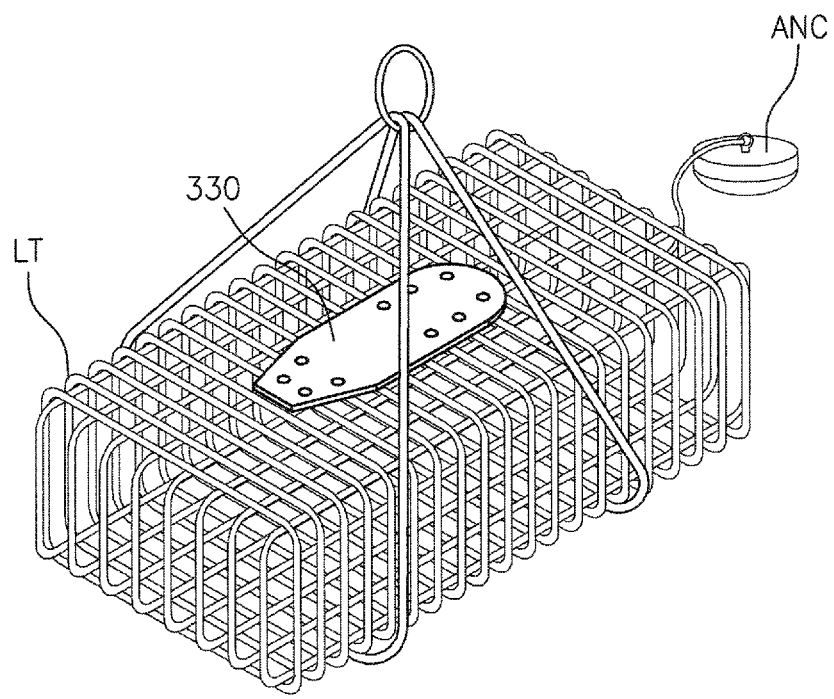
Figure 13:
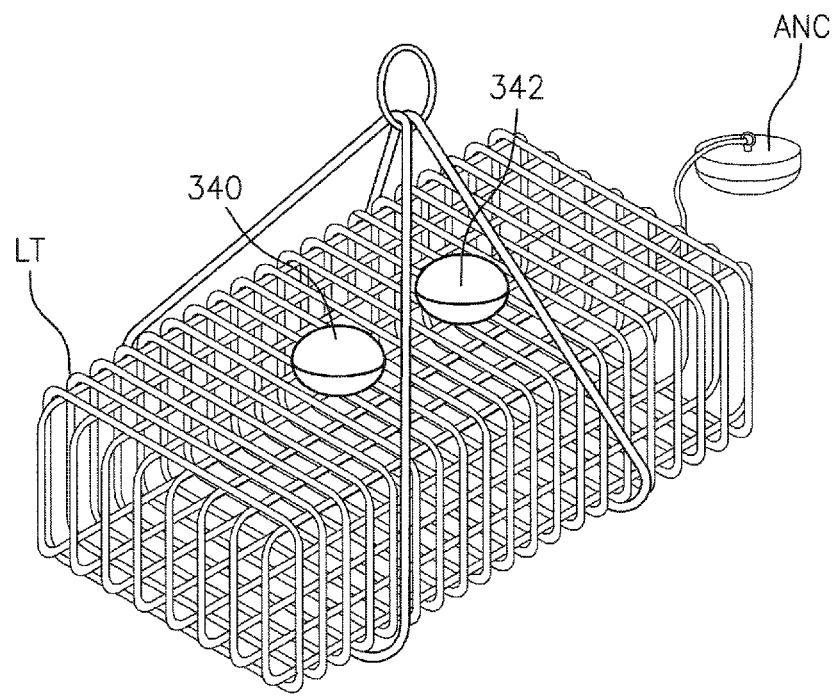

The on-call system may further comprise one or more reflectors (e.g., acoustic reflectors) to assist the echo-sounder in accurate fishing gear detection. The reflectors may be any material, shape, or dimension capable of reflecting back the sonar signal for detection by the user as shown in FIGS. 10-13 depicting various types of acoustic reflectors positioned on a lobster trap LT with an anchor ANC for use with a retrieval system according to the present invention. FIG. 10 showing six spaced PVC pipe reflectors 310. FIG. 11 shows seven grouped metal tube reflectors 320. FIG. 12 depicts a steel plate reflector 330, and FIG. 13 shows two trawl floats 340 and 342.

In some embodiments, the reflector is comprised of metal (e.g., steel, stainless steel, steel alloy, aluminum, titanium, and the like), thermoplastic, synthetic polymer (e.g., polyvinyl chloride (PVC), polyethylene, polypropylene, polyamides, etc.). Suitable shapes include convex, concave, rounded, curved, flat, ridged, spherical, cylindrical, ovoid, V-shaped, and any custom molded shape. Furthermore, the reflector may be designed as any surface capable of reflecting the signal including, but not limited to, a tube, a sheet, a panel, a tile, a semi-sphere, a cube, a rectangle, a dish, and a suitable custom shape.

A plurality of reflectors may be placed on the on-call system and/or connected traps to facilitate the passive detection of the system. In some cases, only one reflector is employed, however many cases use up to 4, 6, 8, 10, 14, 16, 18, 20, and up to 50 or more reflectors. Each reflector or group of reflectors are attached in an orientation suitable for their purpose using an attachment means such as nuts, bolts, u-bolts, zip-ties, straps, hinges, brackets, chains, and the like.

As shown in FIGS. 10-13, the reflector is usually directly attached to the trap, but any position is suitable as long as the signal can be detected off of the deployed system. Such positions include the top of the spool assembly, the top of the trap, the side of the trap, the side of the end cap, inside the trap, floating from either the spool assembly or trap, or any other position deemed suitable by one skilled in the art.

Acoustic methods can also provide ways to allow fishing vessels to detect the presence of on-call fishing gear. In some embodiments, an acoustic transmitter is integrated into on-call system that could send replies to acoustic queries sent from fishing vessels. Although almost all fishing vessels include an echosounder with a visual display, currently there is no straightforward way for an on-call fishing system on the seafloor to reply to echosounder pings and display useful information with existing units. In such cases, an additional acoustic transducer and electronic instrument is provided for fishing vessels. Even with an acoustic transmitter, replying to echosounder pings or acoustic interrogations would consume some of the limited battery energy on the release system, and so a system equipped with active acoustics would benefit from passive acoustic detectability.

Load

Any load, trap, or submergible object that is needed to be placed at a low profile position on the bottom of a water body may be used with the present invention as deemed suitable by one skilled in the art. When used for fishing, any trap used for lobsters, crabs, fish, or other animals, particularly commercially valuable animals, is suited for use. The load or other object typically rests on the bottom of the body of water, but may float over the bottom as long as the load preferably retains a substantially low profile in the water column or at least does not present an entanglement hazard for animals.

The on-call system may comprise one or more loads which are often connected together in a manner similar to the load organization of trawl 10b, FIG. 1B. Additionally, one or more spool assemblies may be used with the load(s).

In many embodiments, the spool assembly holding the line is tethered to the load wherein when the release mechanism is actuated, the line (and the spool assembly) is released into the water column to reach the water surface while remaining tethered to the load.

Kit Exchange and Re-Spooling

The present invention envisions a corresponding onshore line pack industry to improve the turnaround time for re-rigging and resetting the on-call fishing system. Storage of line at sea can be a limiting factor in system deployment. For example, an offshore boat that is at sea for 3 to 4 days and lays 10 to 15 trawls per day, the boat would need to carry 30 to 60 pre-loaded line cartridges if the line cartridges were not reloaded on the boat, and they would need to carry 30 to 60 recovered vertical lines (but the total of pre-loaded line spools and recovered lines is constant, since a pre-spooled line spool goes out for each recovered line coming in). Each line cartridge would be a cylinder about 30" high by 32" in diameter. On the order of 10-15 line cartridges could fit into the 4'×6'×6' line locker on the average offshore boat, so significant additional line storage would be required, possibly on deck for the pre-spooled line cartridges. Alternately, a crew member is often dedicated to coiling the incoming line into the line locker as it is hauled, and potentially he could operate a re-spooling machine.

To minimize the time required at sea to redeploy gear, an onshore re-spooling industry would provide pre-spooled line cartridges, also referred to as pre-wound line packs or pre-wound line units, that fishermen can rapidly install onto an empty spool assembly. There are a number of technical hurdles to this idea, including that a large volume of line would be difficult to store on many fishing vessels, which argues for an onboard re-spooling machine rather than an onshore service industry. If the minimum line diameter allowable can be reduced from ½" to perhaps ⅜", design requirements would be eased significantly, allowing a smaller system with a lower buoyancy requirement, and easier storage of pre-spooled line cartridges.

Figure 15:
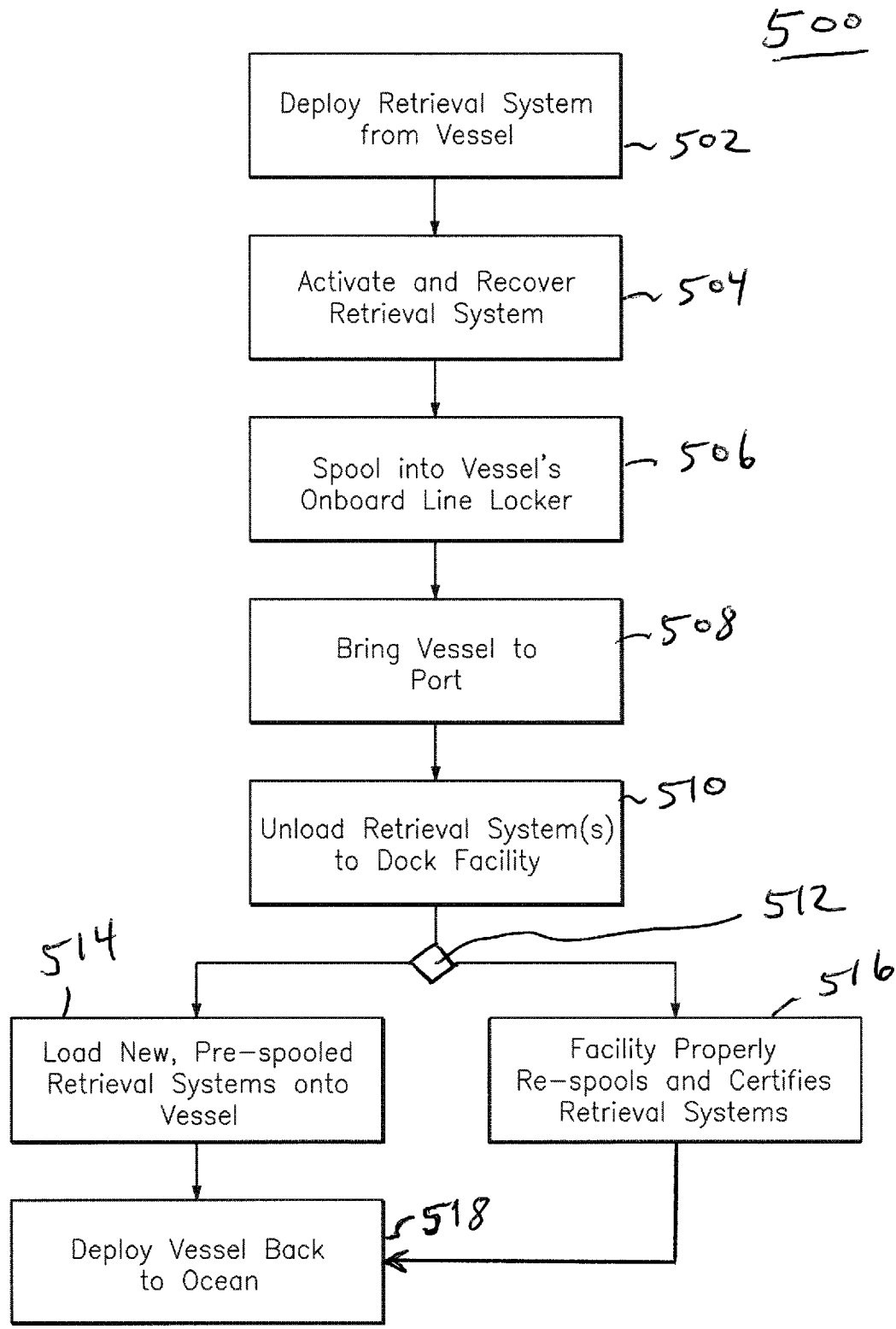
FIG. 15 is a flow chart illustrating re-loading and/or re-spooling steps according to another aspect of the present invention.

Flow chart 500, FIG. 15, illustrates re-loading and/or re-spooling steps according to this aspect of the present invention. A retrieval system according to the present invention is deployed from a vessel, step 502. After a desired and/or pre-selected period of time, a release mechanism is actuated, step 504, and the used retrieval system is recovered with unspooled line. The line is spooled or otherwise gathered into a line locker aboard the vessel, step 506, and brought to port, step 508. The used retrieval system is unloaded at a dock facility, step 510. A decision is made, step 512, to load separate "new", pre-spooled retrieval systems onto the vessel, step 514, or to re spool and certify the used retrieval systems, step 516. After loading, the vessel is re-deployed back to the ocean or other body of water, step 518. In either case, the vessel can carry extra pre-wound line units that can be loaded as needed onto spool assemblies according to the present invention.

Although spooling the recovered line onto the flotation spool assembly via traditional means (by spinning the spool and winding the line) is possible, it would be burdensome and time consuming to handle these tasks while on site, adding precious time and labor to each trawl recovery. Utilizing a pre-wound line pack spool allows for a quick turn-around on site. Line packs could be wound by fishermen while on shore or via a service industry that could be created to collect recovered lines from fishermen as they return to port and then replaced with custom length line packs.

Collapsible mandrels, also referred to herein as collapsible reels, would be utilized in some constructions to establish the appropriate inner diameter of the line cartridges while providing easy separation of the line cartridges from the mandrels. In certain constructions the mandrels are formed of two or more sections that are held in an expanded condition during winding and then are moved to a second, reduced diameter position to assist separation.

Figure 14A:
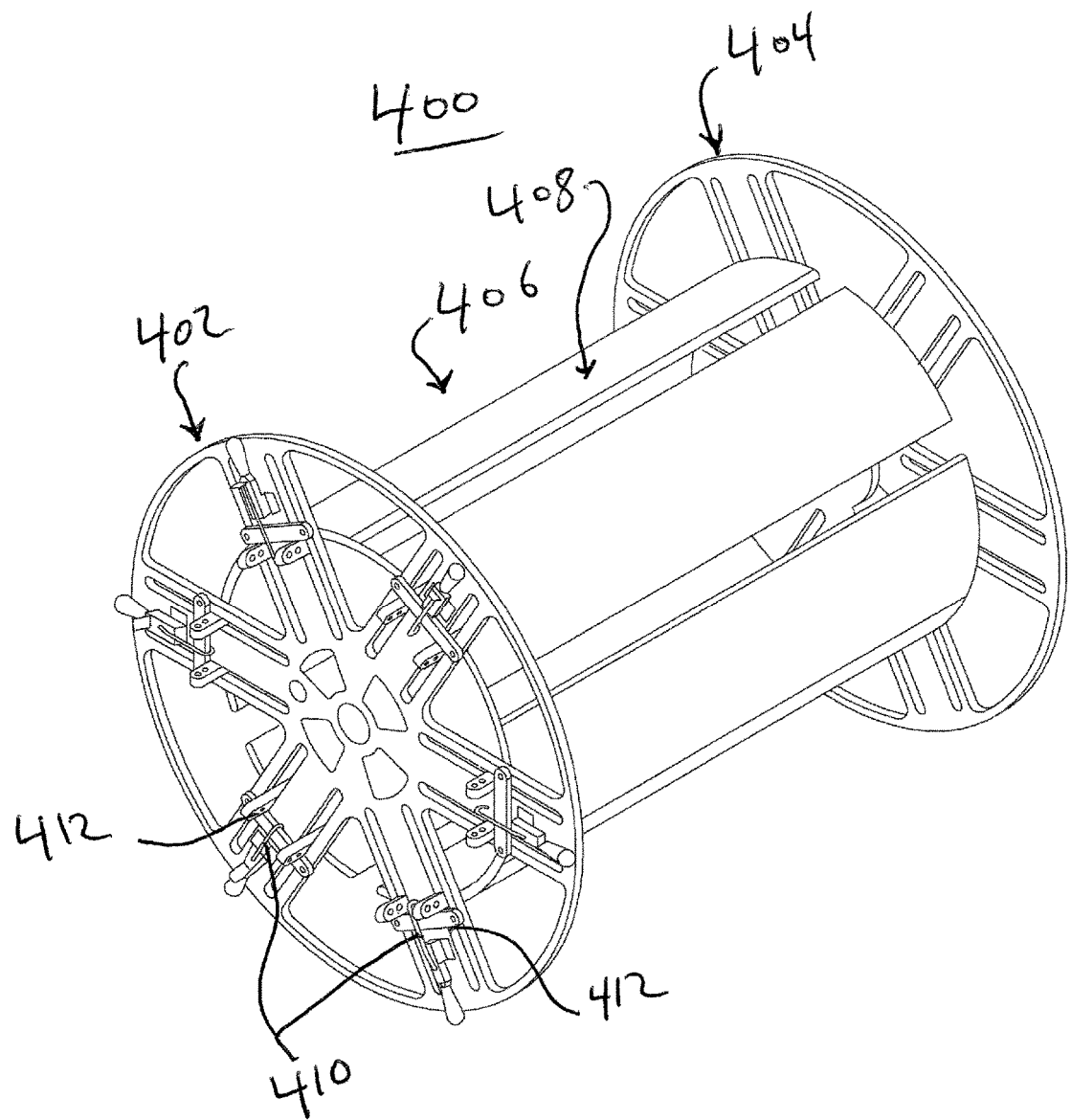
FIGS. 14A-14B are schematic perspective and side views, respectively, of a collapsible mandrel according to the present invention.
Figure 14B:
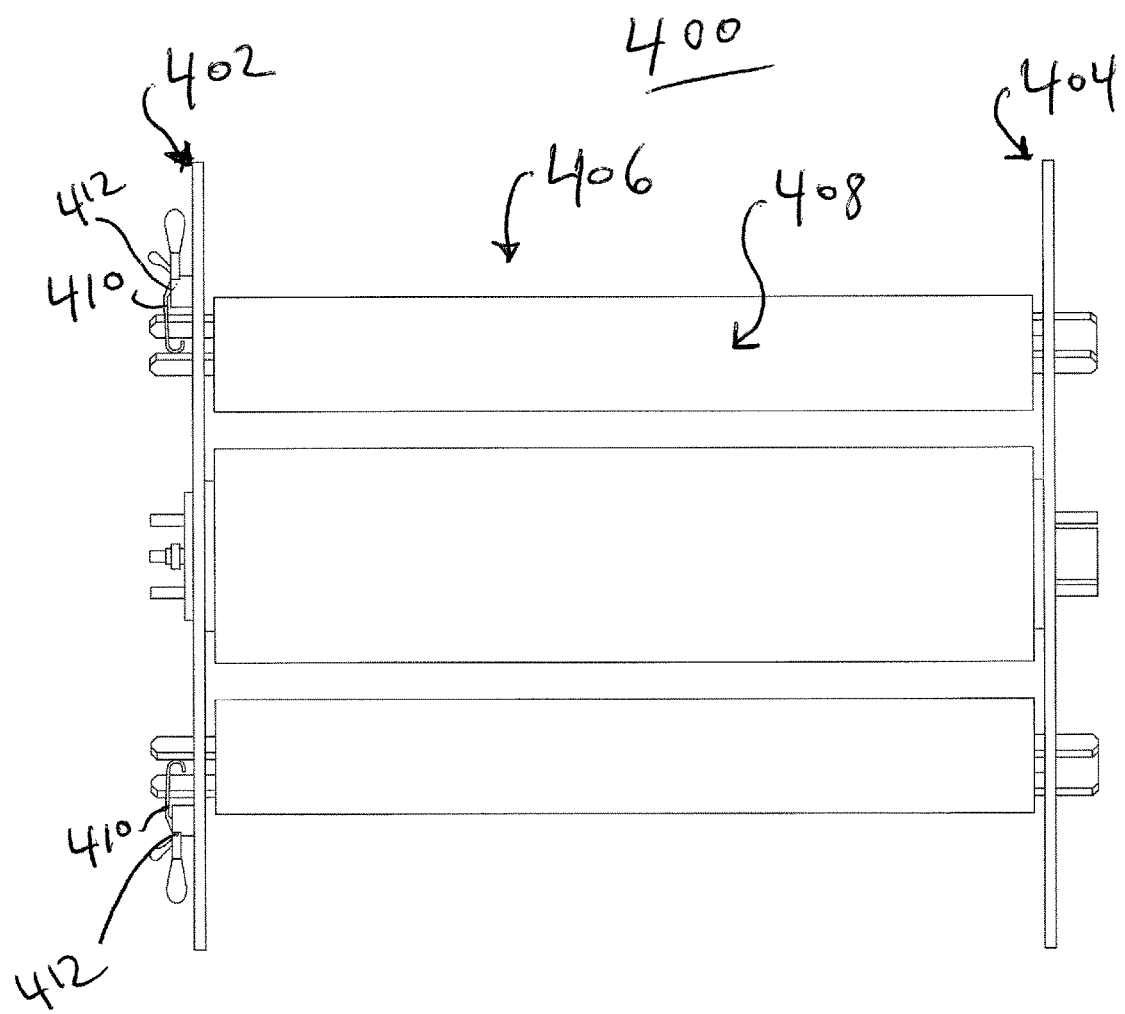
Figure 14C:
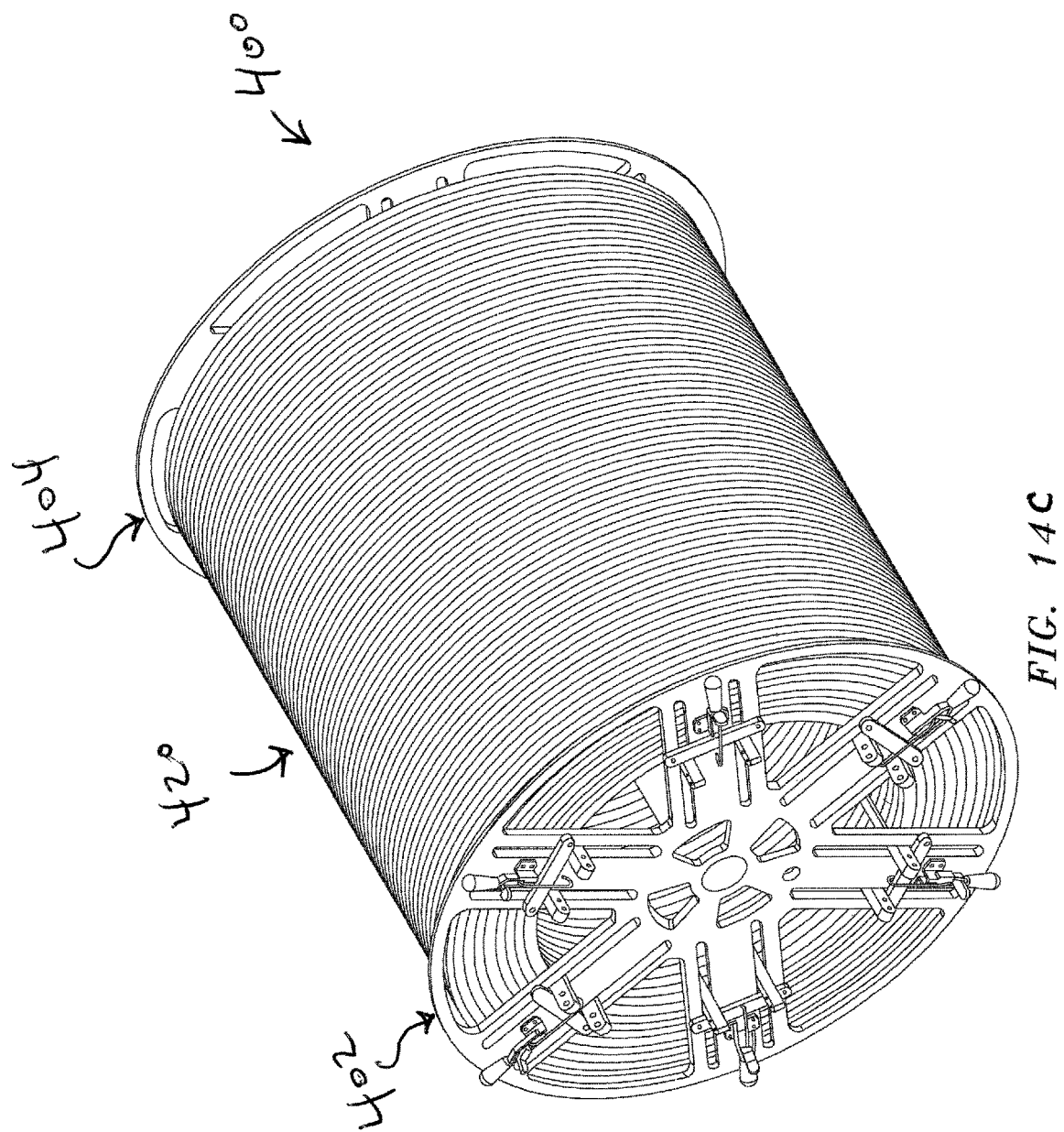
FIG. 14C is a schematic perspective view similar to FIG. 14A showing a pre-wound toroidal line unit according to the present invention formed on the mandrel.
Figure 14D:
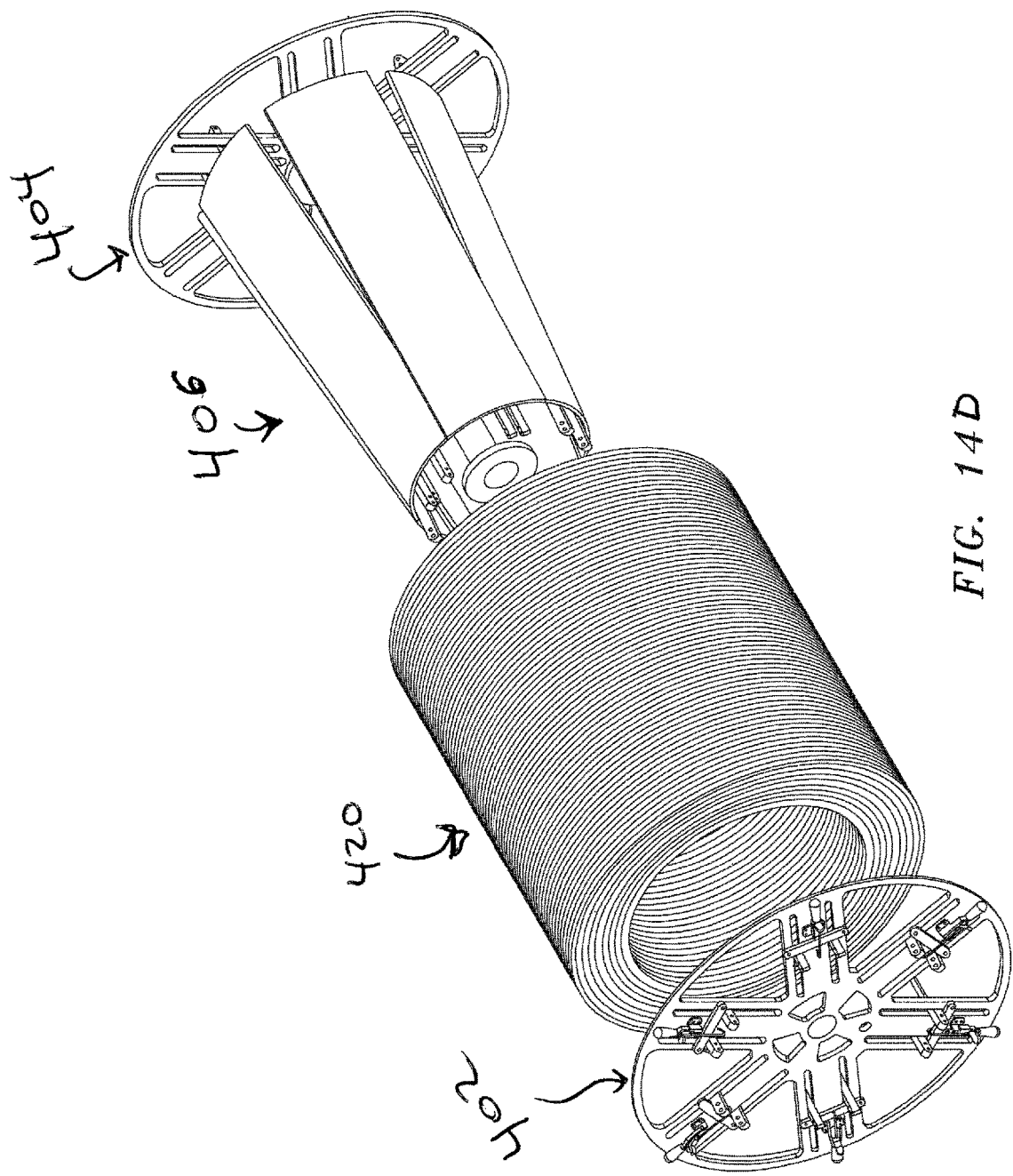
FIG. 14 D is a view similar to FIG. 14C showing the pre-wound toroidal unit being removed from the mandrel while collapsed.

Collapsible mandrel fixture 400, FIGS. 14A-14B, according one aspect of the present invention has cheek plates 402, 404 separated by spacers 406 that establish a winding surface 408. Cables 410 are secured by clamps 412 to hold mandrel 400 in the expanded condition shown in FIGS. 14A-14C. After winding a line to form pre-wound toroidal line unit 420, clamps 412 are actuated to release cables 410 to disengage cheek plate 402 so that pre-wound toroidal unit 420 can be removed from the mandrel while collapsed.

A typical spool of line has a core or mandrel of wood or cardboard that the line is wound onto. However, in the case of the on-call buoys according to the present invention, any added material potentially adds weight which reduces the amount of available buoyancy. To minimize weight and waste (for example, disposal would be needed for a cardboard core) the line is wound onto a collapsible mandrel fixture. In one technique according to the present invention, steps include:

The fixture is mounted onto a winding cart.

A layer of paper or other thin substrate is wound onto the mandrel as a barrier to prevent the line with mastic or adhesive from sticking to the mandrel.

The fixture is rotated on the line cart to wind the line onto the fixture.

Once a layer of line spans the entire width of the fixture, a mastic or adhesive is spread across the layer to bond the coils of line together.

Then the next layer of line is wound on to the fixture and the process repeats. The coils and the layers of coils bond together.

When the appropriate length of line has been wound onto the fixture and the mastic or adhesive has cured, the fixture is removed from the line cart.

The clamps securing the mandrel to the cheek plates of the fixture are released allowing for the mandrel components to collapse inward away from the line.

The cheek plate is removed allowing the coreless spool of line to be removed from the mandrel fixture.

The coreless spool of line can now be installed onto the flotation core of the on-call buoy.

Several examples of usage in the northern Atlantic Ocean are provided as follows.

Example 1

Offshore lobster fishing in New England waters is particularly challenging for several reasons: heavy line is used to haul trawls of 20 to 50 traps and deep water (300 m at the edge of the continental shelf) with strong surface currents (1 to 2 knots, requiring scope of 2:1 or more near the Gulf Stream) require the system to have significant line capacity and buoyancy. Additional design considerations for an on-call fishing system are that gear handling be manageable and compatible with existing equipment typically found on offshore fishing vessels. However, marine animals, even whales, cannot break these heavier offshore lines and often become tangled. With an estimated 20,000 vertical lines exist in the offshore fishery, there is a need for an on-call system to decrease these line numbers.

An Example 1 system provides enough buoyancy (approximately 150 lbs) and line capacity (e.g., scope of 3:1 or 900 m of ½" line) to support operation in waters of 300 m and 1-2 knots of surface currents.

The Example 1 system has a footprint of 31.1" diameter× 42.8" tall, weighing approximately 350 lbs when loaded with 900 m of ½" line such as Amsteel® Hydropro line or similar high performance line for offshore operations. More critically, the system weighs 130 lbs when unspooled (unloaded), which is the weight fishermen will handle during recovery, and is comparable to weights of offshore traps and anchors. The Example 1 system as designed is easily scalable to operate in shallower waters and/or in areas of lower surface currents, Line scopes will need to be between 2:1 and 3:1, with about 140 to 180 lbs of buoyancy in order to bring the line to the surface. To be compatible with existing hauling equipment, gear weights, and dimensions on offshore fishing vessels, design requirements included a unit that could be used with a line diameter of at least ½", has a maximum weight of about 180 lbs, and a maximum length of about 4 ft. An on-call fishing system also cannot dramatically impact the onsite time required to deploy and haul offshore trawls.

The release system was designed to accommodate both a timer-based release trigger function and an active acoustic-based release trigger function. Presently, the timer-based release trigger allows the user to program a designated date and time for the release mechanism to activate and allow the system to rise to the surface. The Li-Ion battery system provides approximately 300 Watt-hours of capacity to support about 6 months of usage on a single charge. Designed within is a rechargeable system which improves the overall system's reliability by not requiring the user to open the pressure housing every time the batteries need to be refreshed, hence reducing the risk of internal fouling during reassembly such as to an o-ring.

Example 2

The following example describes the use of a gear detector to detect deployed on-call fishing gear or other variations of fishing gear to inform other fisherman from laying their gear in the same area or at least in the same orientation and prevent gear entanglements. Described is one illustrated embodiment not meant the limit the scope of the present invention.

Passive detectability of deployed fishing gear (e.g., On-call gear systems) may be accomplished without an acoustic transmitter on the on-call system although possible. In such cases where an acoustic transmitter (e.g., active acoustic detectability) is integrated with the on-call system, the modular system may be easily adapted to manage the increased battery consumption by increasing power capacity, reducing power consumption of other components, or other suitable method by one in the art. In other cases, the system may comprise both a gear detector for passive detectability and active detectability.

The passive gear detector often comprises a fish-finding depth sounder (e.g., echosounder, depth sounder) or a similar sonar device to detect and/or record the reflected signals off of the on-call system. In one embodiment, the system utilizes a depth sounder such as a Vexilar SP200A T-BOX SonarPhone (http://www.sonarphone.mobi) which has a dual-frequency 83 kHz/200 kHz transducer with a 20°/40° beamwidth. Other embodiments use a pencil-beam sonar

TABLE 6

Comparison of On-call system specifications.

| Name | Depth Rating | Line Capacity | Scope | Buoyancy | Release Type | Line Pack Type |
|---|---|---|---|---|---|---|
| FioBuoy, FioMarine, AU | Two models: 100 m and 200 m | 100 m model: 120 m of 10 mm line 200 m model: 250 m of 10 mm line | 120:100 250:200 | Up to 18 lbs, air-filled plastic spool | Timer or acoustic | Line spool |
| DeAlteris 1999; Allen & DeAlteris 2007 | 200 m | 300 m of ⅜" line | 300:200 | 38 lbs (14" trawl float) | Acoustic (Benthos) | Random-packed canister |
| Hopkins & Hoggard 2006 | 20 m (tested) | Not specified | N/A | Not specified | Acoustic (Sub Sea Sonics AR50) | Line canister |
| Liggins & Westley, 2011, New South Wales, AU | 120 m | Not specified | N/A | Two small trawl floats (estimated <50 lbs) | Acoustic with galvanic action backup | Mesh bag |
| Turner et al 1999 (design study) | 1200' (365 m) | 1400' (425 m) of ⅛" rope | 425:365 | 8 lbs (plastic trawl float) | Acoustic mock-up with fish-finder sonar | Line spool |
| Present Invention (Example 1 System) | 300 m (and a safety margin) | 600 m to 900 m line of at least ½" line for trap hauler compatibility | (i.e., 2:1 to 3:1) | Need 180 lbs in 2-knot current in 300 m depth with 3:1 scope for margin with wind, waves, and surface layer | Timed release, acoustic release, or galvanic release | Line cartridge |

(e.g., narrow beam sonar device) which has about 15 to 20 wavelengths at 50 kHz and requires a very achievable timing resolution of several hundred microseconds. The ideal sonar device employs a narrow enough beam to be able to distinguish a target from the seafloor around it, but a wide enough beam so that the fishing vessel would not need to be directly on top of the trap to detect it acoustically.

Sonar device frequency can be optimized for deep water use with the present system. In many embodiments, this frequency is between 83 kHz and 200 kHz. Although the beamwidth is wider at 83 kHz than it is at 200 kHz, 83 kHz would be more representative of the frequency used in deep water. However, 200 kHz has the benefit of a (slightly) narrower beam as well as showing more structure (though also noise) in the water column. Preferably, passive acoustic detectability should ensure that all measurements are made at the same frequency.

As shown in FIGS. 10-13, many different designs are applicable with the present invention. In some constructions, the spool assembly itself acts as a reflector wherein the end cap alone or with an additional reflector contributes to the passive detectability. In some constructions, the benthic object such as a trap LT is capable of reflecting the signal for detection. In FIGS. 10 and 11, the reflectors are cylindrical and attached horizontally to the top of the trap, either grouped together or spaced apart. However, similar embodiments float these reflectors either horizontally or vertically in the water column above either the trap or the on-call system. In another embodiment shown in FIG. 11, the cylindrical reflectors are grouped together to reflect the signal for detection. In another embodiment, the reflector 330, FIG. 12, is a flat plate such as a metal plate secured to the top of the trap (as shown) or may be attached to the spool assembly. In other embodiments, floats 340, 342, FIG. 13 (e.g., buoys, trawl floats) are used to reflect the detection signal.

In one embodiment, the reflector is comprised of poly vinyl chloride (PVC) in a cylindrical shape of approximately ¾"×12", with the end caps cemented in place. Using Schedule 80 PVC pipe with ¾" diameter provides a rated working pressure of 690 psi, which provides roughly a 50% safety margin at the target depths of 300 m. In another embodiment, the reflector is comprised of metal in the shape of a cylinder of about 1.5"×24" with the ends welded or otherwise sealed shut. In another embodiment, the reflector is a steel plate of about ½" thick and dimensions of approximately 7"×20". In even other embodiments, the reflector is a float such as a trawl float with a 7" diameter.

In terms of operational deployment, traps are stacked on top of each other when on the fishing vessel, and two trap reflector designs in particular seem potentially well-suited to allow stacking. Capped PVC pipes could be zip-tied on the inside of the traps, or a flat reflective plate could be attached on top of them. In order to significantly increase the strength of the return signal from a flat plate, syntactic foam or perhaps metal could be cast with a retroreflector (or similar surface capable of reflecting light back to its source with minimal scattering) surface similar to a bicycle reflector, which incorporates many retroreflectors into a flat surface.

The retroreflector section may be any suitable shape, but is often a corner reflector with mutually perpendicular reflective surfaces similar to a sailboat's passive radar reflector. For a deep water (around 300 m), echosounder frequency of about 50 kHz (wavelength about 3 cm), the retroreflector facets are on the order of 5 to 10 cm across, which makes an extended structure relatively thick. Alternatively, a few larger corner reflectors may be placed inside the trap facing up.

Example 3

Described in this example is one embodiment of method of use of the on-call system and additional design considerations.

One key design aspect includes the typical sizes and weights handled by offshore lobster fishermen and their gear handling equipment. In certain embodiments, the weight of approximately 130 lbs, and dimensions of about 43"×32" for recovering the empty spool assembly without a line cartridge is on the order of an offshore lobster trap with catch (over 100 lbs) and is less than the average "anchor sleds" that can be 180 lbs.

The retrieval system before deployment is significantly heavier, about 350 lbs, but deployment is easier than recovery as deploying similarly sized instruments from the back of vessels is generally performed by streaming the gear behind the boat and pushing the retrieval system and anchor over last, sometimes with a crowbar or other additional force.

In field deployments, it is recommended that the on-call retrieval system be floated at a nominal height of 5 m above the anchor and the ocean bottom, in order to avoid fouling with bottom and other residual gear that may be present. This 5 m length of line between the anchor and the system will also be of use during deployment, as it will allow the retrieval system to be secured to the deck with temporary quick-release gear-handling lines (or similar) while the trawl is streaming out behind the fishing vessel. When the vessel is at the target deployment location for the retrieval system with line cartridge, the quick-release lines on the spool assembly are released and the weight and drag of the trawl will pull the system off the back of the vessel with minimal handling being required by the crew. Additionally, having the flotation spool assemblies set 5 m above the bottom may also increase passive acoustic visibility to aid with gear conflicts if active acoustics are not utilized.

Typical offshore fishing conditions in New England include 100-160 fathom (180-300 m) bathymetry contour lines at the edge of the continental shelf near various canyons. The water depths in the areas surrounding the deeper contour change drastically over short distances, reaching up to 200-400 fathoms (365-731 m) over a distance of less than one nautical mile. Additionally, offshore fisherman often deploy their gear where eddies from the Gulf Stream would induce strong currents of 1-2 knots that would submerge a pair of Polyform floats that were providing approximately 150 lbs of buoyancy. To compensate for the drastic changes in bottom topography and strong current, they use a scope of vertical line greater than that of the water depth. Additionally, the fishermen typically use a ⅝" diameter line rather than the ½" line in order to increase the longevity of the line. In particular, the sinking ground line picks up sediment grains that then abrade as it is squeezed through the pot hauler plates. Similarly, salt crystals in line that has dried out without a fresh water rinse can abrade rope fibers. Using larger diameter line increases the useful life of the line.

Reference throughout this specification to "one embodiment," "an embodiment," or similar language means that a particular feature, structure, or characteristic described in connection with the embodiment is includable in at least one embodiment. Thus appearances of the phrase "in one embodiment," "in an embodiment," and similar language throughout this specification may, but do not necessarily, all refer to the same embodiment.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed:

1. A retrieval system for use with underwater objects to be retrieved from a selected depth, comprising:
   a flotation device having at least a selected amount of buoyancy;
   a release mechanism that is capable of releasably engaging an anchor;
   a controller to actuate the release mechanism when a selected condition is achieved; and
   a spool assembly having a frame for carrying (i) the floatation device, (ii) the release mechanism, (iii) the controller and (iv) in combination with the flotation device, a quantity of line having a length greater than the selected depth, wherein the spool assembly is capable of receiving the quantity of line as a pre-wound unit.

2. The retrieval system of claim 1 wherein the frame includes a spine with an upper end cap, at least one of (i) a lower spine plate and (ii) a lower end cap, and a central portion including a plurality of elongated members extending between the upper end cap and the at least one of the lower spine plate and the lower end cap.

3. The retrieval system of claim 2 wherein the release mechanism is positioned proximate to the lower end cap.

4. The retrieval system of claim 2 wherein the lower end cap is removably secured to the central portion to assist at least one of (a) loading and (b) releasing the line relative to the central portion.

5. The retrieval system of claim 2 wherein the flotation device defines a curved outer surface and is removably secured to the central portion of the spine to establish a core outer diameter.

6. The retrieval system of claim 2 wherein the flotation device is formed from at least two sections, each section being removably secured to the central portion of the spine.

7. The retrieval system of claim 2 wherein the controller is contained within a water-proof housing having a depth rating at least as great as the selected depth.

8. The retrieval system of claim 7 wherein the controller includes at least one of a timer, a clock, and an acoustic transducer, or a combination thereof.

9. The retrieval system of claim 1 further including the quantity of line being pre-wound in a toroidal shape as the pre-wound unit that defines an inner opening having a first diameter, and wherein the pre-wound unit retains its toroidal shape prior to installation on the spool assembly.

10. The retrieval system of claim 9 further including a binder applied to at least a portion of the line to assist retention of the toroidal shape of the pre-wound unit.

11. The retrieval system of claim 10 wherein the frame in combination with the flotation device forms a central section having a second diameter which is less than or equal to the first diameter of the pre-wound unit to receive and carry the pre-wound unit.

12. The retrieval system of claim 1 further including an anchor removably connected to release mechanism and having a weight sufficient to counteract the selected amount of buoyancy of the flotation device to retain the spool assembly at the selected depth.

13. A modular retrieval system for use with underwater objects to be retrieved from a selected depth in a water column, comprising:
    a flotation device defining a cylindrical outer surface having a first diameter and having at least a selected amount of buoyancy;
    a release mechanism that is capable of releasably engaging an anchor;
    a housing containing a controller for actuating the release mechanism when a selected condition is achieved;
    a quantity of line having a length greater than the selected depth, the line being wrapped in a toroidal shape as a pre-wound unit that defines an inner opening having a second diameter that is at least as large as the first diameter; and
    a spool assembly having a spine including an upper end cap, at least one of (i) a lower spine plate and (ii) a lower end cap, and a central portion including a plurality of elongated members extending between the upper end cap and the at least one of the lower spine plate and the lower end cap, the release mechanism being positioned proximate to the lower end cap, and the central portion carrying the floatation device, the release mechanism, the controller and the quantity of line, wherein the spool assembly is capable of (a) receiving the pre-wound unit onto the central portion after removal of at least one of the lower spine plate and the lower end cap, and (b) carrying the pre-wound unit after reattachment of the at least one of the lower spine plate and the lower end cap.

14. The retrieval system of claim 13 wherein the retrieval system retains a low profile in the water column until actuation of the release mechanism and, when the release mechanism is actuated, the retrieval system is released into the water column and rises to the surface of the water.

15. The retrieval system of claim 13 wherein the lower end cap is removably secured to the central portion to assist at least one of (a) loading and (b) releasing the line relative to the central portion.

16. The retrieval system of claim 13 wherein the line retains its toroidal shape prior to installation on the spool assembly.

17. The retrieval system of claim 13 wherein the flotation device is modular and is formed from at least two sections, each section being removably secured to the central portion of the spine.

18. The retrieval system of claim 13 further including a binder applied to at least a portion of the line to assist retention of the toroidal shape of the pre-wound unit.

19. The retrieval system of claim 13 wherein the controller is contained within a water-proof housing having a depth rating at least as great as the selected depth.

20. The retrieval system of claim 13 wherein the length of the line is at least 400 m.

21. The retrieval system of claim 13 wherein the line has a diameter greater than 3/8 inch.

22. A method of enabling reloading of a retrieval system for use with underwater objects to be retrieved from a selected depth, comprising:
  selecting a quantity of line having a length greater than the selected depth;
  forming the line into a toroid defining an inner opening having a first inner diameter, including applying a binder to at least a portion of the toroid such that the line retains its toroidal shape by itself to create a pre-wound toriod; and
  providing the pre-wound toroid to a user of a retrieval system having a spool assembly with a frame defining, in combination with a flotation device, a central portion with an outer diameter that is the same or less than the first inner diameter to receive and carry the toroid.

23. A method of reloading a retrieval system suitable for underwater use, comprising:
  accepting a retrieval system after the retrieval system has been used, wherein the retrieval system is an assemblage of components including a flotation device having at least a selected amount of buoyancy, a release mechanism that is capable of releasably engaging an anchor, a controller to actuate the release mechanism when a selected condition is achieved, and a spool assembly having a frame for carrying (i) the floatation device, (ii) the release mechanism, (iii) the controller and (iv) in combination with the flotation device, a quantity of line having a length greater than the selected depth;
  respooling the line onto the retrieval system as a pre-wound unit using either the original line or a replacement line; and providing the reloaded retrieval system to the user.

24. The method of claim 23 further including reconditioning of at least some of the components of the retrieval system, including the line after it has been used underwater.

25. The method of claim 23 including forming the line into the pre-wound unit as a toroid defining an inner opening having a first inner diameter, and applying a binder to at least a portion of the toroid such that the line retains its toroidal shape by itself.

* * * * *